US011843422B2

(12) United States Patent
Mukherjee et al.

(10) Patent No.: US 11,843,422 B2
(45) Date of Patent: Dec. 12, 2023

(54) PHASE NOISE COMPENSATION IN A WIRELESS SYSTEM

(71) Applicant: Charter Communications Operating, LLC, St. Louis, MO (US)

(72) Inventors: Amitav Mukherjee, Elk Grove, CA (US); Dumitru M. Ionescu, Poway, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 11 days.

(21) Appl. No.: 17/384,973

(22) Filed: Jul. 26, 2021

(65) Prior Publication Data
US 2023/0034052 A1      Feb. 2, 2023

(51) Int. Cl.
*H04B 15/00*     (2006.01)
*H04B 17/345*    (2015.01)

(52) U.S. Cl.
CPC ......... *H04B 15/005* (2013.01); *H04B 17/345* (2015.01)

(58) Field of Classification Search
CPC ............................ H04B 15/005; H04B 17/345
See application file for complete search history.

(56) References Cited

U.S. PATENT DOCUMENTS

| 10,608,799 B2 | 3/2020 | Nam et al. |
| 2004/0196915 A1* | 10/2004 | Gupta ................. H04L 27/2695 375/260 |

FOREIGN PATENT DOCUMENTS

| CN | 101796833 A | * | 8/2010 | ............. H04H 20/55 |
| CN | 106664278 A | * | 5/2017 | ............... H04B 1/38 |
| EP | 2860876 A1 | | 4/2015 | |
| WO | 2022098456 A2 | | 5/2022 | |
| WO | 2022125262 A1 | | 6/2022 | |

OTHER PUBLICATIONS

3GPP TSG RAN WG4 Meeting #95-e, R4-2009245, "Reply LS to RAN2 on dormant BWP", Release 16, May 25-Jun. 5, 2020, pp. 1.
5G; "NR; NR and NG-RAN Overall Description; Stage 2," 3GPP TS 38.300 version 16.2.0 Release 16, ETSI TS 138 300 V16.2.0 (Jul. 2020), pp. 1-150.

(Continued)

*Primary Examiner* — Samina F Choudhry
(74) *Attorney, Agent, or Firm* — Armis IP Law, LLC

(57) ABSTRACT

According to one configuration, a system includes a first wireless station in communication with a second wireless station. A phase noise predictor model such as associated with the first wireless station receives phase noise information. The phase noise information captures an estimate of: i) first phase noise associated with a first wireless station, and ii) second phase noise associated with a second wireless station. Based on the received phase noise information, the predictor produces phase noise adjustment information. The predictor applies the phase noise adjustment information to adjust (compensate) a signal of the first wireless station. Adjustment of the signal results in phase noise adjustment with respect to both the first phase noise associated with the first wireless station and the second phase noise associated with the second wireless station.

36 Claims, 13 Drawing Sheets

(56) References Cited

OTHER PUBLICATIONS

5G; NR: "Radio Resource Control (RRC)" Protocol specification, (3GPP TS 38.331 version 16.1.0 Release 16), ETSI TS 138 331 V16.1.0 (Jul. 2020), pp. 1-886.
Bello, Philip A., "Characterization of Randomly Time-Variant Linear Channels," IEEE Transactions on Communications Systems, vol. 11, No. 4, Dec. 1963, pp. 360-393.
CMCC, Revised WID: Extending current NR operation to 71 GHz, 3GPP TSG RAN Meeting #90-e, RP-202925, Electronic Meeting, Dec. 7-11, 2020, pp. 1-6.
Garcia, Ana Armada, Understanding the Effects of Phase Noise in Orthogonal Frequency Division Multiplexing (OFDM), IEEE Transactions on Broadcasting, vol. 47, No. 2, Jun. 2001, pp. 1-7.
Intel Corporation, Revised SID: Study on supporting NR from 52.6 GHz to 71 Ghz, 3GPP TSG RAN Meeting #88e, RP-200902, Electronic Meeting, Jun. 29-Jul. 3, 2020 (revision of RP-193259), pp. 1-3.
Schenk, et al., "Analysis of the Influence of Phase Noise in MIMO OFDM based WLAN systems", in Proceedings Symposium IEEE Benelux Chapter on Communications and Vehicular Technology, (SCVT2003), Nov. 2003, pp. 1-8.
Schenk, et al., "On the Influence of Phase Noise Induced ICI in MIMO OFDM Systems", IEEE Communications Letters, vol. 9, No. 8, Aug. 2005, pp. 682-684.
Stamoulis, et al., "Intercarrier interference in MIMO OFDM," IEEE Transactions on Signal Processing, vol. 50, No. 10, Oct. 2002; pp. 2451-2464.
Petrovic, et al., "Effects of Phase Noise on OFDM Systems With and Without PLL: Characterization and Compensation", IEEE Transactions on Communications, vol. 55, No. 8, Aug. 2007, pp. 1607-1616.
Demir, et al, Phase Noise in Oscillators: A Unifying Theory and Numerical Methods for Characterization: IEEE Transactions on Circuits and Systems-I: Fundamental Theory and Applications, vol. 47, No. 5, May 2000, pp. 655-673.
3rd Generation Partnership Project; Technical Specification Group Radio Access Network; NR; Medium Access Control (MAC) protocol specification (Release 16), 3GPP TS 38.321 V16.0.0, Mar. 2020, pp. 1-141.
Choe, Sangho, et al, "A Multi-Step Predictive CDMA Closed-Loop Power Control Scheme for Time-Varying Fading Channels", 2006 IEEE, pp. 120-123, 23rd Biennial Symposium on Communications.
Costa, Elena, et al., "M-QAM-OFDM System Performance in the Presence of a Nonlinear Amplifier and Phase Noise", IEEE Transactions on Communications, vol. 50, No. 3, Mar. 2002, pp. 462-472.
Ionescu, D. Mihai, et al., "Predictability of Uplink Channels from Downlink Channels in Frequency Division Duplex Systems: A Power Control Application", IEEE Transactions on Wireless Communications, vol. 3, No. 5, Sep. 2004, pp. 1781-1788.
Ionescu, D. Mihai, et al., "Predictive Closed-Loop Power Control for Frequency-Division Duplex Wireless Systems", IEEE Communications Letters, vol. 5, No. 6, Jun. 2001, pp. 248-250.
Robertson, Patrick, et al, "Analysis of the Effects of Phase-Noise in Orthogonal Frequency Division Multiplex (OFDM) Systems", 1995 IEEE, pp. 1652-1657, Oxford University Libraries: Downloaded on Mar. 31, 2010.
Schniter, Philip, "Low-Complexity Equalization of OFDM in Doubly Selective Channels", IEEE Transactions of Signal Processing, vol. 52, No. 4., Apr. 2004, pp. 1002-1011.
International Search Report and the Written Opinion, PCT/US2022/037714, pp. 1-14.

* cited by examiner

PHASE NOISE COMPENSATION IN A WIRELESS SYSTEM

BACKGROUND

So-called Phase Noise (PN) is a common source of error in wireless systems operating at high carrier frequencies such as in millimeter-wave spectrum. In general, phase noise occurs due to imperfections at respective local oscillators at in a transmitter and a receiver. In a MIMO OFDM (Multiple Input Multiple Output Orthogonal Frequency Division Multiplexing) system (for e.g., 5G New Radio), paging notification causes both a common phase error (CPE) (multiplicative factor) on the OFDM subcarriers, as well as intercarrier interference (ICI) (additive component) among the subcarriers. Phase noise effects are exacerbated as a magnitude of the wireless carrier frequency increases.

A Rel-17 Study Item on extending NR (New Radio) operation to the frequency range 52.6 GHz-71 GHz has been in progress. This feature targets utilization of the very wide unlicensed and licensed spectrum bandwidths in this frequency range.

New OFDM numerologies, such as a subcarrier spacing of 960 kHz and 480 kHz, have been introduced for this frequency range in order to increase robustness against phase noise.

In NR, phase tracking reference signals (PT-RS or so-called Phase Tracking Reference Signals) have been introduced to facilitate phase noise estimation and compensation at a wireless receiver. Both DL (DownLink) and UL (UpLink) PT-RS transmissions can be configured to provide phase noise estimation.

In one conventional application, on the DL, PT-RS signals are allocated within the time-frequency resources used for PDSCH (Physical Downlink Shared Channel). On the UL, PT-RS signals are allocated within the time-frequency resources used for PUSCH (Physical Uplink Shared Channel). The time-domain and frequency-domain density of the PT-RS is set to either a default value or configured by higher layers. PT-RS signals are designed to not overlap or collide with demodulation reference signals (DM-RS).

Phase noise in a MIMO-OFDM system with $N_t$ transmit antennas, $N_r$ receive antennas, and K subcarriers can be modeled as:

$$y=(G_r \otimes I_r)H(G_t \otimes I_t)x+w,$$

where $y \subset C^{KN_r \times 1}$ is the received complex frequency-domain signal, the K×K matrices $G_r$ and $G_t$ represent Rx-side and Tx-side phase noise, $\otimes$ is the Kronecker product operator, $I_r$ and $I_t$ are $N_r \times N_r$ and $N_t \times N_t$ identity matrices, $H \subset C^{KN_r \times KN_t}$ is a block-diagonal matrix representing the overall fading channel coefficients, $X \subset C^{KN_t \times 1}$ is the transmitted signal vector, and $W \subset C^{KN_r \times 1}$ is additive complex Gaussian noise.

Element (k,l) of $G_t$ with guard interval g and random phase θ can be written as $$g(k-l) = \frac{1}{K}\sum_{i=0}^{K-1} \exp(j\theta_{t,g+i+1})\exp\left(-j\frac{2\pi i(k-l)}{K}\right)$$

BRIEF DESCRIPTION OF EMBODIMENTS

There are deficiencies associated with conventional techniques of providing wireless connectivity. For example, phase noise compensation (especially on the receiver-side of a wireless station pair) is a complex procedure that requires estimation of phase noise from reference signals. In contrast to conventional techniques, embodiments herein propose several ways of providing novel phase noise pre-compensation at one or more wireless stations in a network environment. The phase noise pre-compensation as discussed herein can be implemented in any suitable frequency range. In one nonlimiting example embodiment, the phase noise compensation is implemented in a frequency range of 52 to 71 GHz.

In accordance with example embodiments, a system includes a first wireless station in communication with a second wireless station. A phase noise management resource such as associated with or implemented in the first wireless station receives observations that carry phase noise information. The received phase noise information provides an estimate of a combination of: i) first phase noise associated with a first wireless station, and ii) second phase noise associated with a second wireless station. Based on the received phase noise information, and determined common phase error, the phase noise management resource produces phase noise adjustment information. Via the phase noise adjustment information, the phase noise management resource adjusts one or more signals produced by the first wireless station. Adjustment of the one or more signals results in phase noise adjustment to both the first phase noise associated with the first wireless station and the second phase noise associated with the second wireless station.

In one embodiment, the phase noise adjustment provided by the phase noise management resource (based on the phase noise adjustment information and determined common phase error) alleviates the need for the second wireless station to implement phase noise adjustment. For example, the phase noise adjustment information implemented at the first wireless station provides at least partial phase noise correction for both the first phase noise associated with a first local oscillator in the first wireless station and the second phase noise associated with a second local oscillator in the second wireless station.

Further embodiments herein include, via the phase noise management resource in the first wireless station, receiving communications from the second wireless station. The second wireless station generates the phase noise information based on wireless communications received from the first wireless station.

Additionally, or alternatively, the phase noise management resource at the first wireless station generates the phase noise information via one or more wireless signals received from the second wireless station.

Further embodiments herein include, via the phase noise management resource, controlling a density of repeatedly transmitting a wireless reference (pilot) signal from the first wireless station to the second wireless station, or vice-versa, based on the phase noise information; samples of the wireless reference signal are used to derive samples of the phase noise information.

In one embodiment, the one or more phase noise management resources as discussed herein implement a predictor to determine an amount of phase noise (common phase error) associated with the wireless stations and corresponding clock (oscillator) signals. For example, in one embodiment, the predictor as discussed herein can be configured to include a phase noise estimator model. The predictor and corresponding coefficient generator derive a set of coefficients from the received phase noise information, apply the generated set of coefficients to a phase noise analyzer model;

and generate the phase noise adjustment information from the phase noise estimator model.

In further example embodiments, the coefficient generator associated with the predictor repeatedly updates the set of coefficients based on samples of the phase noise information received over time. For example, for a first set of coefficients derived from a first sample of the phase noise information, the phase noise estimator applies the phase noise adjustment information to adjust one or more signals (such as phase noise adjustment information associated with sub-carrier frequencies of the one or more signals) for a duration of communicating multiple symbols from the first wireless station using the one or more adjusted phase noise compensated signals; for a second set of coefficients derived from a second sample of the phase noise information, the phase noise management resource applies a second phase noise adjustment information to adjust the one or more signals (such as associated with sub-carrier frequencies) for a duration of communicating multiple symbols from the first wireless station using the one or more adjusted phase noise compensated signals; and so on. Thus, repeatedly updated phase noise information is used to provide accurate phase noise pre-compensation over time.

Note that the phase noise information can be received from one or more resources. For example, in one embodiment, the phase noise management resource receives a first portion of the phase noise information from the first wireless station; the phase noise management resource receives a second portion of the phase noise information from the second wireless station.

In further example embodiments, the phase noise adjustment information adjusts a phase associated with one or more sub-carrier frequency signals based on a summation (common phase error) of the estimated first phase noise and the estimated second phase noise.

In further example embodiments, the signal of the first wireless station falls within a range between 50 and 80 GHz, although the signal can be any suitable magnitude as previously discussed.

Embodiments herein are useful over conventional techniques. For example, implementation of phase noise adjustment correction at a single wireless station, instead of multiple wireless stations, reduces or eliminates a need for complex phase noise circuitry in either or both the first wireless station and the second wireless station. In one embodiment, a first wireless station includes circuitry to determine a combination of phase noise associated with the first wireless station and a second wireless station. The first wireless station implements phase noise estimation and compensation, mitigating phase noise associated with both the first wireless station and the second wireless station. Alternatively, the second wireless station communicates detected phase noise information to the first wireless station that implements phase noise compensation. Yet further, the first wireless station can be configured to implement phase noise compensation based on first phase noise information generated by the first wireless station and second phase noise information generated by the second wireless station.

Note that any of the resources as discussed herein can include one or more computerized devices, wireless stations, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein. Accordingly, embodiments herein are directed to a method, system, computer program product, etc., that supports operations as discussed herein.

One embodiment includes a computer readable storage medium and/or system having instructions stored thereon to facilitate phase noise (pre) compensation (adjustment). The instructions, when executed by computer processor hardware, cause the computer processor hardware (such as one or more co-located or disparately processor devices) to: receive phase noise information, the phase noise information capturing an estimate of common phase error such as associated with: i) first phase noise associated with a first wireless station, and ii) second phase noise associated with a second wireless station; based on the received phase noise information, produce a phase adjustment information (a.k.a., phase noise compensation information); and apply the phase adjustment information to adjust one or more signals of the first wireless station communicated to the second wireless station.

The ordering of the steps above has been added for clarity sake. Note that any of the processing steps as discussed herein can be performed in any suitable order. Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of wireless technology supporting wireless communications. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
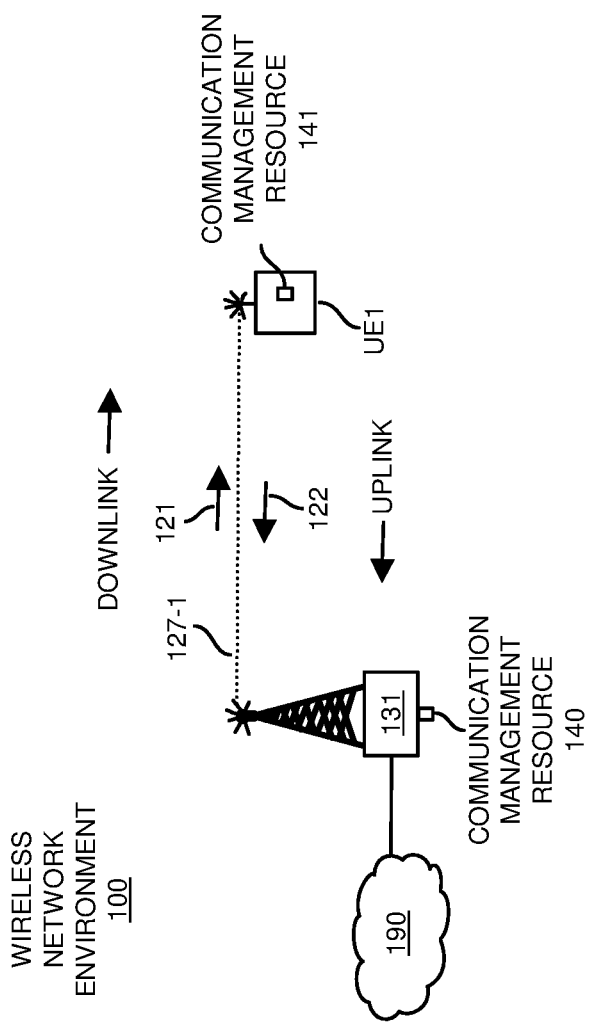
FIG. 1 is an example diagram illustrating a wireless network environment and implementation of compensation according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, a system includes a first wireless station in communication with a second wireless station. A phase noise predictor model such as associated with the first wireless station receives or generates phase noise information. The phase noise information captures an estimate of common phase error such as associated with: i) first phase noise associated with a first wireless station, and ii) second phase noise associated with a second wireless station. Based on the received phase noise information, via derivation of coefficients from the phase noise information, the predictor model produces phase noise adjustment information. An adjustor applies the phase noise adjustment information to adjust one or more signals of the first wireless station. Adjustment of the one or more signals (such as used to transmit data from the wireless base station to the user equipment) results in phase noise compensation with respect to both the first phase noise associated with the first wireless station and the second phase noise associated with the second wireless station, reducing overall phase noise error in the system.

As previously discussed, receiver-side phase noise compensation and removal is usually a complex procedure that requires estimation of phase noise statistics from reference signals, followed by CPE removal and/or ICI filtering. Embodiments herein include several methods for phase noise pre-compensation of a wireless transmitter (either wireless base station or UE). The application of phase noise compensation reduces phase noise associated with a combination of a clock (local oscillator) at the first wireless station and phase noise associated with a clock (local oscillator) at the second wireless station. In one embodiment, the wireless stations implement NR (New Radio) cooperation and compensation in a frequency range 52.6 GHz-71 GHz as the exemplary scenario.

Now, more specifically, FIG. 1 is an example diagram illustrating a wireless network environment and implementation of compensation according to embodiments herein.

In this example embodiment, the wireless network environment 100 includes wireless base station 131 (a first wireless station) and one or more instances of mobile devices (such as UE1, UE2, etc.).

During operation, the user equipment UE1 establishes a respective wireless link 127-1 with the wireless base station 131. Via the wireless communication link 127-1, the wireless base station 131 provides the user equipment UE1 access to network 190 (such as the Internet, cellular network, etc.).

In an uplink (a.k.a., upstream) direction, the wireless communication link 127-1 supports communications 122 from the user equipment UE1 through the wireless base station 131 to the network 190. In a downlink (a.k.a., downstream) direction, the wireless communication link 127-1 supports communications 121 from the network 190 through the wireless base station 131 to the user equipment UE1.

In one embodiment, the wireless base station 131 includes a communication management resource 140 to support, among other things, phase noise compensation as discussed herein. Depending on the embodiment, user equipment UE1 includes communication management resource 141 supporting phase noise compensation as discussed herein. Additional details of the phase noise compensation are further discussed below.

Note that one embodiment includes implementation of phase noise pre-compensation in the case when the transmitter-side (such as wireless base station 131) phase noise profile is known with high accuracy to the transmitter (e.g., base station), and the transmitter-side estimate of the receiver-side PN is imperfect.

In one embodiment, so-called UE-side (such as user equipment UE1) phase noise statistics (a.k.a., phase noise information) are obtained at the base station 131 using one or both of the following methods: i) via the communication management resource 141, implementing phase noise estimation at the UE1 via generation of phase noise information, which is communicated (fed back) over the wireless communication link 127-1 to the base station 131 on an uplink control information message (e.g., PUCCH, etc.); and/or ii) phase noise estimation and generation of phase noise information at the communication management resource 140 of the wireless base station 131 based on uplink communications (such as repeated PT-RS transmissions or other signals) from the user equipment, the reference signals capture the effect of UE transmit phase noise, and assuming that UE transmit phase noise on the uplink is statistically correlated with UE1 phase noise associated with receiving data on the downlink from the wireless station 131.

In further example embodiments, the transmitter-side phase noise characteristics are estimated based on knowledge of the corresponding local oscillator architecture and characteristics.

As further discussed herein, note further that, based on the knowledge of UE-side phase noise information, the base station 131 can be configured to select an appropriate time-frequency density configuration associated with communication of the reference signals such as PT-RS communicated on the downlink to the user equipment UE1. In other words, one or more of the wireless base station 131 and corresponding communication management resource 140 can be configured to: i) control a density of communicating wireless reference (pilot) signals in a downlink to the user equipment UE1 depending on use by the user equipment UE1 to generate phase noise information; ii) a density of communicating wireless reference (pilot) signals in an uplink to the wireless station 131 depending on system needs, and so on.

Figure 2:
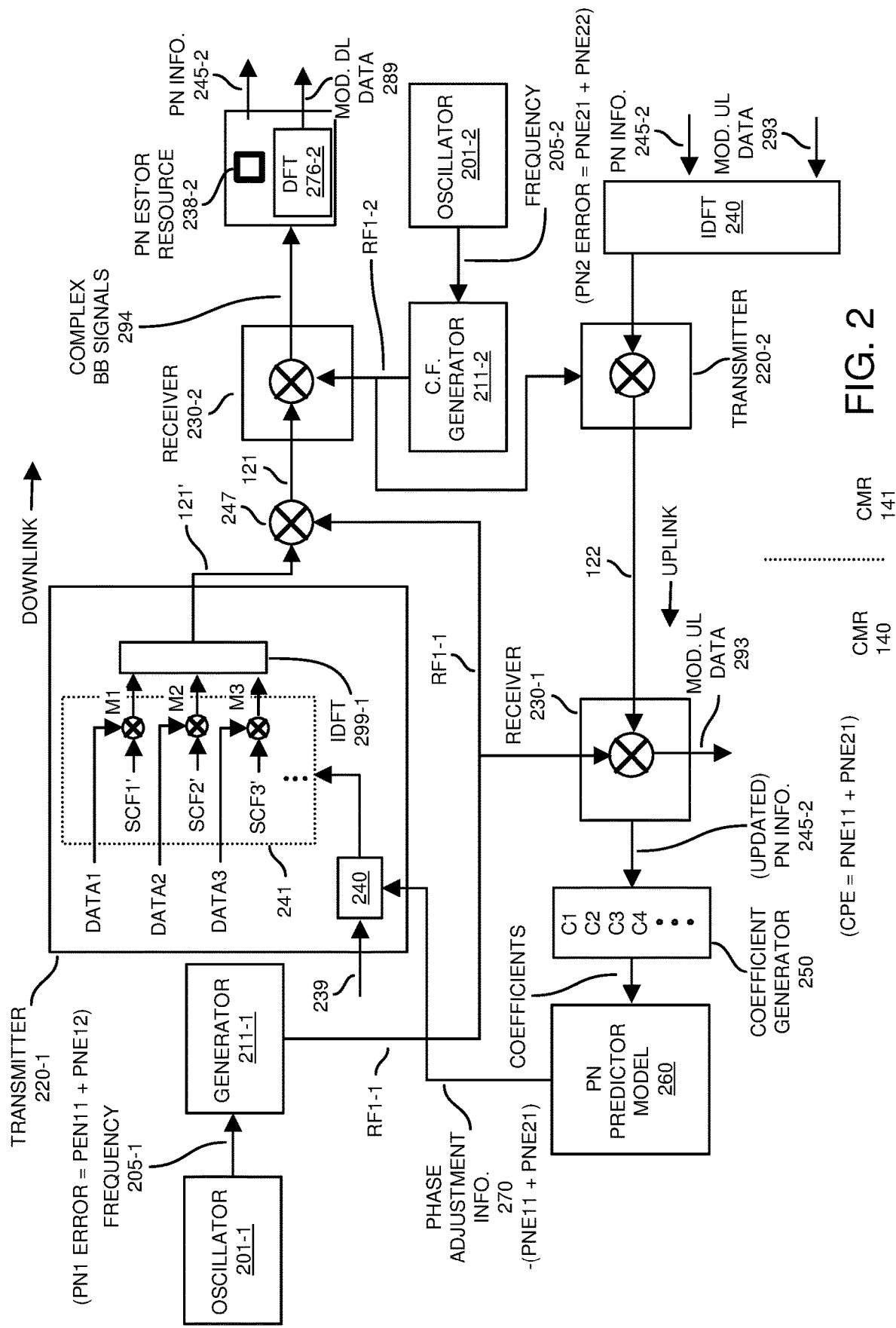
FIG. 2 is an example block diagram illustrating components of a wireless system and implementation of phase noise estimation and compensation in a wireless station such as user equipment according to embodiments herein.

FIG. 2 is an example block diagram illustrating components of a wireless system and implementation of a phase noise estimator in a wireless station such as user equipment according to embodiments herein.

As shown in this example embodiment, the communication management resource 140 includes multiple resources.

Note that any of the resources as discussed herein can be implemented via hardware, software, or a combination of hardware and software. For example, the communication management resource 140 can be implemented via communication management hardware, communication management software, or a combination of communication management hardware and communication management software; the communication management resource 141 can be implemented via communication management hardware, communication management software, or a combination of communication management hardware and communication management software; phase noise predictor model 260 can be implemented as phase noise predictor model hardware, phase noise predictor model software, and phase noise predictor model hardware and phase noise predictor model software; phase adjustor 240 can be implemented as phase adjustor hardware, phase adjustor software, or a combination of phase adjustor hardware and phase adjustor software; phase noise estimator resource 238-1 or 238-2 can be implemented as phase noise estimator hardware, phase noise estimator software, or a combination of phase noise estimator hardware and phase noise estimator software; and so on.

In this example embodiment, the communication management resource 140 associated with the wireless station 131 includes oscillator 201-1, generator 211-1, transmitter 220-1, receiver 230-1, coefficient generator 250, and phase noise predictor model 260. Transmitter 220-1 in this example embodiment includes phase (noise) adjustor 240.

The communication management resource 141 associated with the user equipment UE1 includes oscillator 201-2, generator 211-2, receiver 230-2, transmitter 220-2, and phase noise estimator resource 238-2.

In this example embodiment, the oscillator 201-1 (such as main clock) produces a frequency signal 205-1 supplied to the frequency generator 211-1. The frequency signal 205-1 is susceptible to phase noise error, resulting in phase noise error including phase noise error PNE11 (such as common phase noise error) and PNE12 (such as non-correctable phase noise error).

The oscillator 201-2 produces a frequency signal 205-2 supplied to the frequency generator 211-2. The frequency signal 205-2 is susceptible to phase noise, resulting in phase noise error including phase noise error PNE21 (such as correctable phase noise error) and PNE22 (such as non-correctable phase noise error).

Embodiments herein include providing phase noise compensation (such as correction) for the generally correctable phase noise error PNE11 and phase noise error PNE21 as further discussed herein.

More specifically, in this example embodiment, the phase adjustor 240 receives sub-carrier frequency signals 239 (such as sub-carrier frequency SCF1, sub-carrier frequency SCF2, sub-carrier frequency SCF3, . . . ) in the base-band supplied to the transmitter 220-1. The sub-carrier frequencies in the base-band include phase noise error. The phase adjustor 240 also receives phase adjustment information 270 (negative of the detected common phase error PNE11 and PNE21). As its name suggests, the phase adjustment information 270 adjusts (compensates) one or more signals associated with the wireless station 131 via the phase adjustment information 270.

Figure 5:
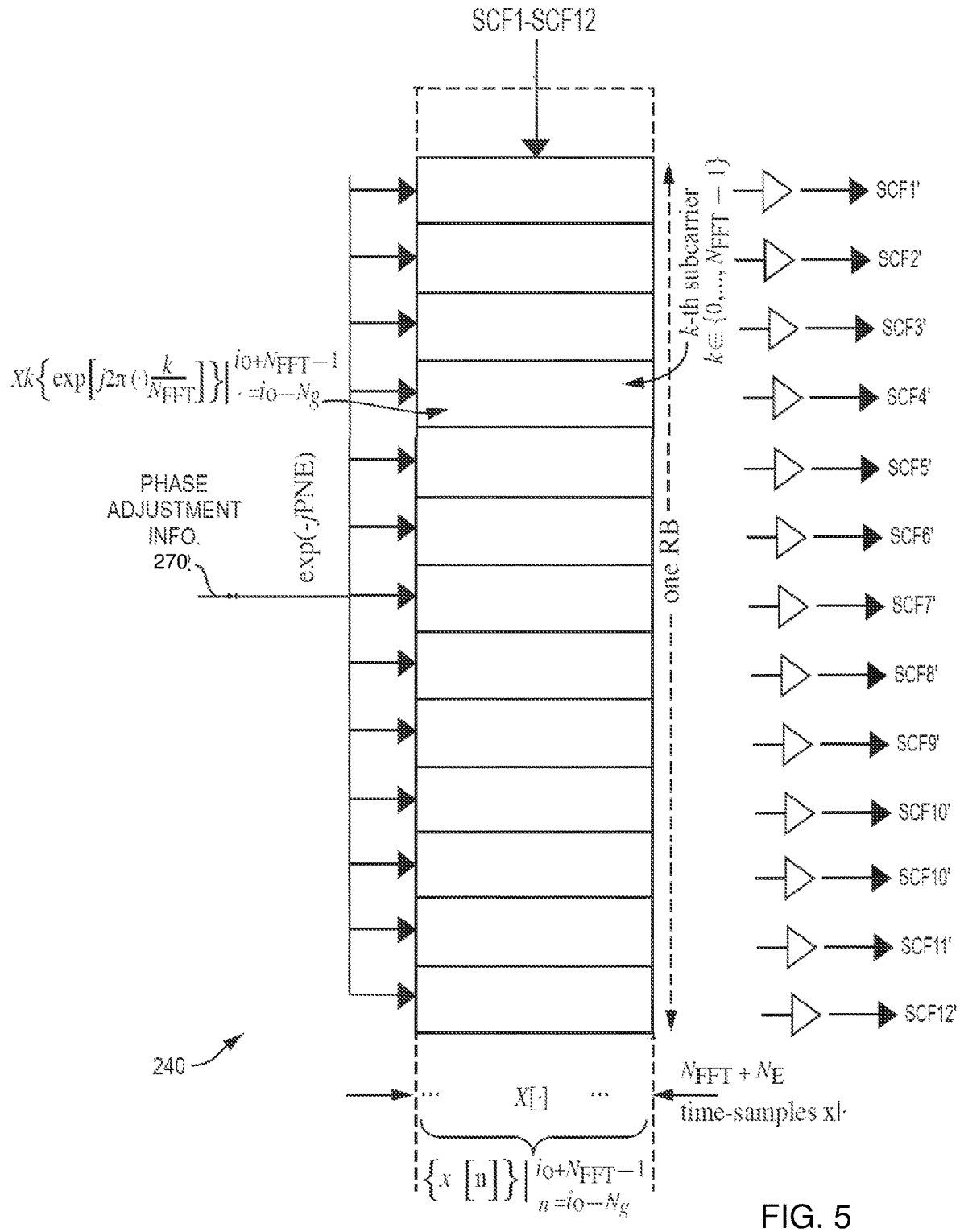
FIG. 5 is an example diagram illustrating implementation of phase noise adjustments in the frequency domain according to embodiments herein.

For example, in one embodiment, the phase adjustor 240 applies the phase adjustment information 270 (compensation information) to each of the sub-carrier frequencies 239 to produce phase noise compensated sub-carrier frequencies SCF1', SCF2', SCF3', . . . . An example is shown in FIG. 5.

Referring again to FIG. 2, transmitter 220-1 uses the phase noise compensated sub-carrier frequency signals SCF1', SCF2, SCF3', etc., outputted from the phase adjustor 240 to produce one or more wireless signals communicated to the IDFT (Inverse Discrete Fourier Transform) function 299-1. For example, the signal processor 241 receiving the phase noise compensated sub-carrier frequencies includes a first multiplier M1 that modulates the sub-carrier frequency SCF1' via data DATA1 to produce a sequence of symbols pre-compensated via the phase noise compensated sub-carrier frequency SCF1'; the signal processor 241 includes a second multiplier M2 that modulates the sub-carrier frequency SCF2' via data DATA2 to produce a sequence of symbols modulated via the sub-carrier frequency SCF2'; the signal processor 241 includes a third multiplier M3 that modulates the sub-carrier frequency SCF3' via data DATA3 to produce a sequence of symbols modulated via the sub-carrier frequency SCF3'; and so on.

As further discussed herein, the communication management resource 140 of the wireless station 131 can be allocated any number of sub-carrier frequencies (such as 15 KHz bandwidth×12 sub-carrier frequencies per physical resource block) to support communications in corresponding resource elements of one or more resource blocks. The signal processor 241 can include any number of multipliers to modulate respective data (as symbols) onto signals communicated to the user equipment UE1.

In further example embodiments, the IDFT 299-1 receives the modulated signals produced by the multipliers M1, M2, etc., and produces corresponding signal 121' (time domain signal) encoded with the phase noise compensated signals received from multipliers.

As an alternative to providing phase noise compensation in the frequency domain via signal processor 241, embodiments herein include applying phase noise compensation on the time domain via compensation of signal 121'.

Multiplier 247 receives signal 121' and carrier frequency RF1-1 (such as between 50-80 GHz or other suitable value) produced by the generator 211-1. Multiplier 247 outputs wireless communications 121 (encoded or modulated with respective data) from the wireless station 131 over communication link 127-1 in the downlink direction to the communication management resource 141 associated with user equipment UE11.

In one embodiment, the phase adjustor 240 uses the phase adjustment information 270 as a basis to provide phase noise compensation (reducing phase noise error) to the one or more sub-carrier frequencies 239 or signals generated by the transmitter 220-1. Based on application of the phase adjustment information, the phase adjustor 240 eliminates at least a portion (i.e., the CPE component) of phase noise associated with the sub-carrier frequencies 239.

As previously discussed, the transmitter 220-1 uses data signals DATA1, DATA2, etc., (or pilot signals) to modulate the respective sub-carrier frequencies supporting communications 121 over the wireless communication link 127-1 to the user equipment UE1.

At the user equipment UE1, the generator 211-2 uses the frequency signal 205-2 as a basis to produce carrier frequency RF1-2 (same RF carrier frequency as RF1-1) supplied to the receiver 230-2. The receiver 230-2 demodulates the received communications 121 to produce complex baseband signals 294 (such as including encoded DATA1, DATA2, etc.) communicated from the wireless station 131 to the user equipment UE1. Via the base-band signals 294, the DFT (Discrete Fourier Transform) function 276-2 produces modulated downlink data 289 for further processing and retrieval of corresponding data DATA1, DATA2, etc.

As further discussed herein, in addition to communicating data, the transmitter 220-1 transmits multiple reference signals such as PT-RS (Phase Tracking Reference Signal) signals, DM-RS (Demodulation Reference) signals, etc., via one or more sub-carrier frequencies in one or more different time slots of allocated resource blocks. As further discussed herein, the reference signals can be spread across time (multiple time slots or resource elements) and/or frequency domains (channels) to the user equipment UE1.

In this example embodiment, the phase noise estimator resource 238-2 monitors the received pilot reference signals (such as PT-RS signals, DM-RS signals, etc.) from the transmitter 220-1 and produces phase noise information 245-2 associated with receipt of the reference signals in communications 121. Note that details of such reference signals used to produce the phase noise information 245-2 is further discussed below in FIGS. 8-12.

Referring again to FIG. 2, in further example embodiments, as previously discussed, the generator 211-2 uses the frequency signal 205-2 as a basis to produce one or more carrier frequency signals such as RF1-2. Transmitter 220-2 uses the carrier frequency RF1-2 as a basis in which to communicate phase noise information 245-2, uplink information, reference signals, etc., to the wireless station 131 (via communications 122 including the generated phase noise information 245-2) transmitted over the uplink of the wireless communication link 127-1 to the communication management resource 140 of wireless station 131 for processing.

The receiver 230-1 demodulates the received communications 122 with the carrier frequency RF1-1 (same frequency as RF1-2) to obtain the phase noise information 245-2 generated by the phase noise estimator resource 238-2 and transmitted from the user equipment UE1. In one embodiment, as previously discussed, such phase noise information 245-2 captures information about the total phase noise error (a.k.a., common phase error PNE11+PNE21) associated with the oscillators 201-1 and 201-2.

In further example embodiments, the phase noise information 245-2 is stored in registers of the coefficient generator 250. Based on the received phase noise information 245-2 and stored values, the coefficient generator 250 generates and supplies corresponding phase noise coefficients C1, C2, etc., to the phase noise predictor model 260. Based on the recently generated phase noise information 245-2 and corresponding derived coefficients C1, C2, C3, etc., the phase noise predictor model 260 produces the phase adjustment information 270.

In one embodiment, as its name suggests, the phase adjustment information 270 includes one or more phase adjustment settings (such as the detected phase noise error PNE11+PNE21) supplied to the phase adjustor 240. To provide phase noise pre-compensation at the wireless station 131, the phase adjustor 240 provides signal adjustments or compensation to remove respective phase noise error (common phase error such as PNE11+PNE21) from the signals 121' and subsequent communications 121 transmitted by the transmitter 220-1 of the wireless station 131 to the user equipment UE1.

As further discussed below in FIG. 5, embodiments herein include one or more of providing phase noise adjustments (compensation) via phase adjustor 240 in the frequency domain. Alternatively, note that the phase noise compensation can be achieved in a time domain (such as via modification of signal 121') rather than in the frequency domain via signal processor 241.

Thus, in one embodiment, the communication management resource 140 (such as a phase noise management resource) associated with or in the first wireless station 131 receives phase noise information 245-2 generated by the user equipment UE1. The received phase noise information 245-2 provides an estimate of a combination of common phase error associated with: i) first phase noise (PNE11) associated with the oscillator 201-1 of the wireless station 131, and ii) second phase noise (PNE21) associated with the local oscillator of the user equipment UE1. In this example embodiment, as previously discussed, the phase noise information 245-2 is generated by the phase noise estimator resource 238-2.

Based on the received phase noise information 245-2, the communication management resource 140 produces phase noise adjustment information 270 (phase noise compensation information). Via the phase noise adjustment information 270, the communication management resource 140 adjusts one or more signals associated with the wireless station 131 via phase adjustor 240. As previously discussed, adjustment of the one or more signals (such as adjustment of one or more sub-carrier frequencies) results in phase noise adjustment to both a first portion of phase noise (such as phase noise PE11) associated with the first wireless station 131 and a portion of second phase noise (such as phase noise PE21) associated with the second wireless station UE1.

Note further that, in one embodiment, during a condition when the multipath channel does not change during an OFDM (Orthogonal Frequency Division Multiplexing) symbol, the following opportunities exist. For example, embodiments herein include a method that exploits correlation between CPE (common phase error) in adjacent OFDM symbols. As SCS increases (i.e., OFDM symbol duration decreases) the correlation of the common phase error (CPE) increases among adjacent OFDM symbols. Once a CPE estimate (such as estimate of PNE11 and PNE21) is obtained via phase noise information 245-2, it is fed forward to a few upcoming OFDM symbols.

In further example embodiments, a receiver side predictive method (such as implemented by the phase noise estimator resource 238-2 exploits correlation between CPE (Common Phase Error) in adjacent OFDM symbols. Prediction can be employed, as a refinement of the above, with the state of the predictor re-actualized every few OFDM symbols.

Further embodiments herein include a base station side predictive method that exploits correlation between CPE in adjacent OFDM symbols. For example, in one embodiment, the mobile communication device UE1 can be configured to send CPE estimates to the wireless base station 131 via wireless communications such as PUCCH (Physical Uplink Control Channel) communications or other suitable channel(s). The base station 131 implements the prediction and the predictor state update. The base station 131 optionally applies CPE correction pre-receiver-FFT in the symbols that carry data, but not on symbols that carry reference signals, e.g. CSI-RS.

An example is a simple autoregressive predictor of the form:

$$G(l+1) = \Sigma_{n=1}^{N} a_n G(l-n) + e(l)$$

where the predictor is for either the receiver-side PN or the equivalent end-to-end PN, and the N filter coefficients an are the optimization parameters, and e(t) is residual white noise.

Figure 3:
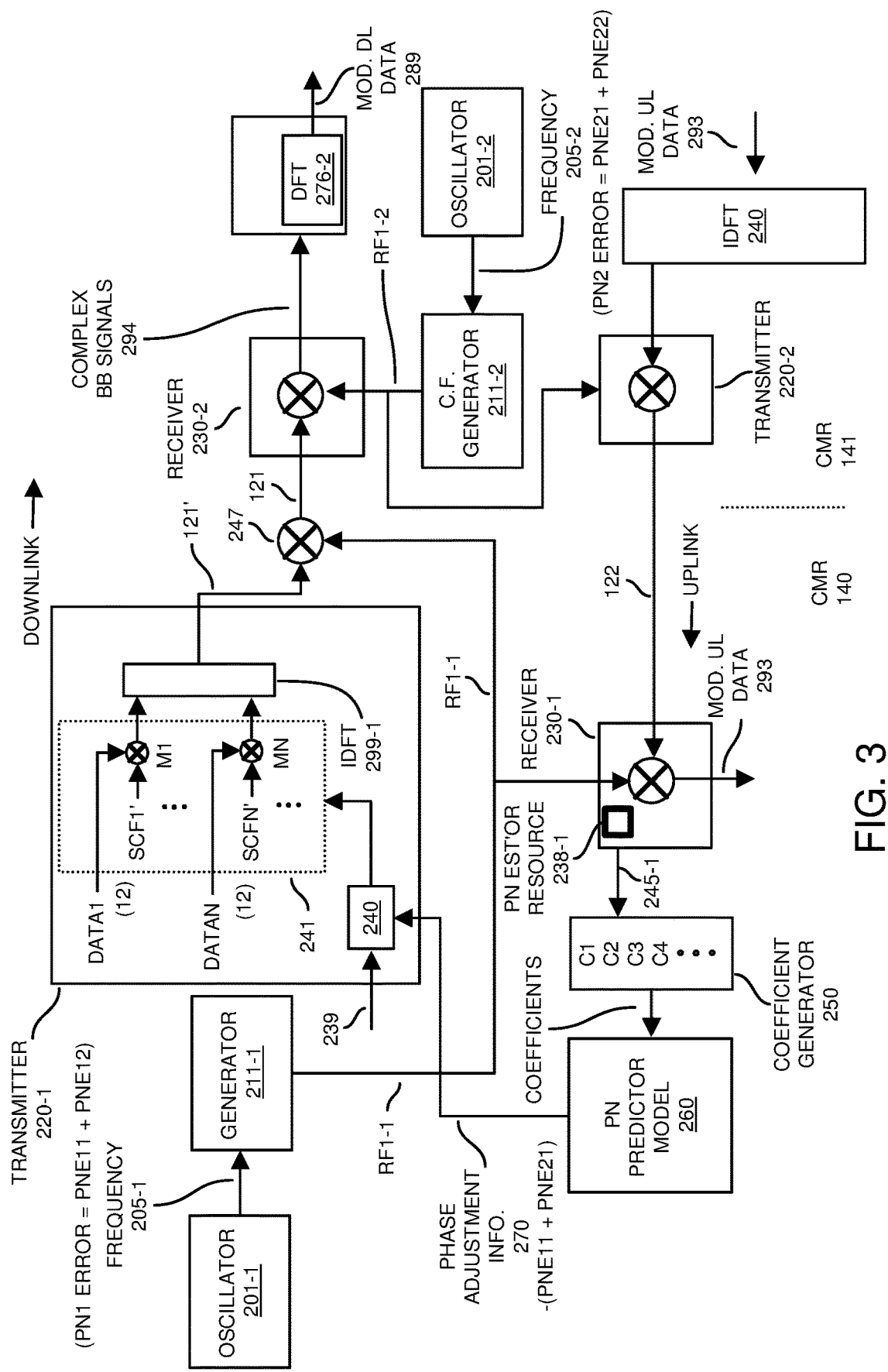
FIG. 3 is an example block diagram illustrating components of a wireless system and implementation of phase noise estimation and compensation in a wireless station (such as a wireless base station) according to embodiments herein.

FIG. 3 is an example block diagram illustrating components of a wireless system and implementation of a phase noise estimator in a wireless station (such as a wireless base station) according to embodiments herein.

As shown in this example embodiment, the communication management resource 140 includes multiple resources.

In this example embodiment, the communication management resource 140 associated with the wireless station 131 includes oscillator 201-1, generator 211-1, transmitter 220-1, receiver 230-1, coefficient generator 250, and phase noise predictor model 260. Transmitter 220-1 in this example embodiment includes phase adjustor 240.

The communication management resource 141 associated with the user equipment UE1 includes oscillator 201-2, generator 211-2, receiver 230-2, transmitter 220-2, and phase noise estimator resource 238-2.

In this example embodiment, the oscillator 201-1 (such as main clock) produces a frequency signal 205-1 supplied to the frequency generator 211-1. The frequency signal 205-1 is susceptible to phase noise, resulting in phase noise error including phase noise error PNE11 (such as correctable phase noise error) and PNE12 (such as non-correctable phase noise error).

The oscillator 201-2 produces a frequency signal 205-2 supplied to the frequency generator 211-2. The frequency signal 205-2 is susceptible to phase noise, resulting in phase noise error including phase noise error PNE21 (such as correctable phase noise error) and PNE22 (such as non-correctable phase noise error).

Embodiments herein include providing phase noise compensation (such as correction) for the generally correctable phase noise error PNE11 and phase noise error PNE21 as further discussed herein.

More specifically, as previously discussed, the phase adjustor 240 receives sub-carrier frequency signals 239 (such as sub-carrier frequency SCF1, sub-carrier frequency SCF2, sub-carrier frequency SCF3, . . . ) supplied to the transmitter 220-1. The phase adjustor 240 also receives phase adjustment information 270 (negative of the detected common phase error PNE11 and PNE21). As its name suggests, the phase adjustment information 270 adjusts a respective phase associated with one or more signals associated with the wireless station 131.

For example, in one embodiment, the phase adjustor 240 applies the phase adjustment information 270 (compensation information) to each of the sub-carrier frequencies 239 to produce phase noise compensated sub-carrier frequencies SCF1', SCF2', SCF3, . . . . An example is shown in FIG. 5.

Referring again to FIG. 3, transmitter 220-1 uses the phase noise compensated sub-carrier frequency signals SCF1', SCF2', SCF3', etc., to produce one or more wireless signals communicated to the IDFT (Inverse Discrete Fourier Transform) function 299-1. For example, the signal processor 241 includes a first multiplier M1 that modulates the sub-carrier frequency SCF1' via data DATA1 to produce a sequence of symbols modulated via the phase noise compensated sub-carrier frequency SCF1'. The signal processor 241 includes a second multiplier M2 that modulates the sub-carrier frequency SCF2' via data DATA2 to produce a sequence of symbols modulated via the sub-carrier frequency SCF2'; and so on. As further discussed herein, the communication management resource 140 of the wireless station 131 can be allocated any number of sub-carrier frequencies (such as 15 KHz bandwidth×12 sub-carrier frequencies per base resource block) to support communications in corresponding resource elements of one or more resource blocks.

The IDFT 299-1 receives the modulated signals produced by the multipliers M1, M2, etc., and produces corresponding signal 121' (time domain signal).

Multiplier 247 receives signal 121' and carrier frequency RF1-1 produced by the generator 211-1. Multiplier 247 outputs wireless communications 121 from the wireless station 131 over communication link 127-1 in the downlink direction to the communication management resource 141 associated with user equipment UE11.

In one embodiment, the phase adjustor 240 uses the phase adjustment information 270 as a basis to provide phase noise compensation (reducing phase noise error) to the one or more sub-carrier frequencies 239. Based on application of the phase adjustment information, the phase adjustor 240 eliminates at least a portion of phase noise associated with the sub-carrier frequencies 239 and/or corresponding signals communicated from the wireless station 131 to the user equipment UE1.

As previously discussed, the transmitter 220-1 uses data signals DATA1, DATA2, etc., (or pilot signals) to modulate the respective sub-carrier frequencies supporting communications 121 over the wireless communication link 127-1 to the user equipment UE1.

At the user equipment UE1, the generator 211-2 uses the frequency signal 205-2 as a basis to produce carrier frequency RF1-2 (same RF carrier frequency as RF1-1) supplied to the receiver 230-2. The receiver 230-2 demodulates the received communications 121 to produce complex base-band signals 294 (such as including DATA1, DATA2, etc.) communicated from the wireless station 131 to the user equipment UE1. Via the base-band signals 294, the DFT (Discrete Fourier Transform) function 276-2 produces modulated downlink data 289 for further processing and retrieval of corresponding downlink transmitted data DATA1, DATA2, etc.

Referring again to FIG. 3, in further example embodiments, as previously discussed, the generator 211-2 uses the frequency signal 205-2 as a basis to produce one or more carrier frequency signals such as RF1-2. Transmitter 220-2 uses the carrier frequency RF1-2 as a basis in which to communicate uplink information, reference signals, etc., to the wireless station 131 transmitted over the uplink of the wireless communication link 127-1 to the communication management resource 140 of wireless station 131 for processing.

As further discussed herein, in addition to communicating data, the transmitter 220-2 transmits multiple reference signals such as PT-RS (Phase Tracking Reference Signal) signals, DM-RS (Demodulation Reference) signals, etc., via one or more sub-carrier frequencies in one or more different time slots. As further discussed herein, the reference signals can be spread across time (multiple time slots or resource elements) and/or frequency domains (channels).

In this example embodiment, the phase noise estimator resource 238-1 monitors the received pilot reference signals (such as PT-RS signals, DM-RS signals, etc.) from the transmitter 220-2 and produces phase noise information 245-1 associated with receipt of the reference signals in communications 122. Note that details of such reference signals used to produce the phase noise information 245-1 is further discussed below in FIGS. 8-12.

Referring again to FIG. 3, the receiver 230-1 demodulates the received communications 122 with the carrier frequency RF1-1 (same frequency as RF1-2) to produce the phase noise information 245-1. In one embodiment, as previously discussed, such phase noise information 245-1 (produced by the phase noise estimator resource 238-1 monitoring reference signals from the user equipment UE1) captures information about the total phase noise error (a.k.a., common phase error PNE11+PNE21) associated with the oscillators 201-1 and 201-2.

In further example embodiments, the phase noise information 245-1 is stored in registers of the coefficient generator 250. Based on the generated phase noise information 245-1, the coefficient generator 250 generates and supplies corresponding phase noise coefficients C1, C2, etc., to the phase noise predictor model 260. Based on the recently generated phase noise information 245-1 and corresponding derived coefficients C1, C2, C3, etc., the phase noise predictor model 260 produces the phase adjustment information 270.

In one embodiment, as its name suggests, the phase adjustment (compensation) information 270 includes one or more phase adjustment settings (such as the detected phase noise error PNE11+PNE21) supplied to the phase adjustor 240. To provide phase noise pre-compensation at the wireless station 131, the phase adjustor 240 provides signal adjustments to remove respective phase noise error (common phase error such as PNE11+PNE21) from the subsequent communications 122 transmitted by the transmitter 220-2 of the user equipment UE1 to the wireless station 131.

As further discussed below in FIG. 5, embodiments herein include one or more of providing phase noise adjustments (compensation) via phase adjustor 240 in the frequency domain. Alternatively, note that the phase noise compensation can be achieved in a time domain (such as via modification of signal 121') rather than in the frequency domain via signal processor 241.

Referring again to FIG. 3, thus, in one embodiment, the communication management resource 140 (such as a phase noise management resource) associated with or in the first wireless station 131 generates phase noise information 245-1 via monitoring of the received wireless communications 122. The generated phase noise information 245-1 provides an estimate of a combination of common phase error associated with: i) first phase noise (PNE11) associated with the oscillator 201-1 of the wireless station 131, and ii) second phase noise (PNE21) associated with the local oscillator of the user equipment UE1. In this example embodiment, as previously discussed, the phase noise information 245-1 is generated by the phase noise estimator resource 238-1.

Based on the received phase noise information 245-1, the communication management resource 140 produces phase noise adjustment information 270. Via the phase noise adjustment information 270, the communication management resource 140 adjusts one or more signals associated with the wireless station 131 via phase adjustor 240. Adjustment of the one or more signals (such as adjustment of one or more sub-carrier frequencies) results in phase noise adjustment to both a first portion of phase noise (such as phase noise PE11) associated with the first wireless station 131 and a portion of second phase noise (such as phase noise PE21) associated with the second wireless station UE1.

Accordingly, embodiments herein include a method for estimating common phase error at the receiver (user equipment or wireless base station), in which the receiver exploits the separation between reference signals in frequency and/or time domains. If separation between adjacent CSI-RSs is larger than the extent of the ICI caused by one subcarrier, then the CSI-RSs do not cause ICI (Inter Carrier Interference) to one another, and a simple averaging of established phase noise will produce an estimate of common phase error as captured by the phase adjustment information 270.

In one embodiment, based on the received pilot symbols (such as reference signals PT-RS, DM-RS, etc.), the receiver averages phase noise determined over multiple CSI-RSs (received pilot signals) to estimate the mean phase noise such as common phase error associated with both. Further embodiments herein include a method for inserting reference signals, e.g., CSI-RSs. As previously discussed, appropriate spacing of the pilot these signals can be controlled in frequency and time domain. Separation of CSI-RSs, e.g. in code domain (e.g., PN), can be implemented in order to 'extract' only reference signals. This will eliminate or greatly reduce phase noise-induced ICI.

Figure 4:
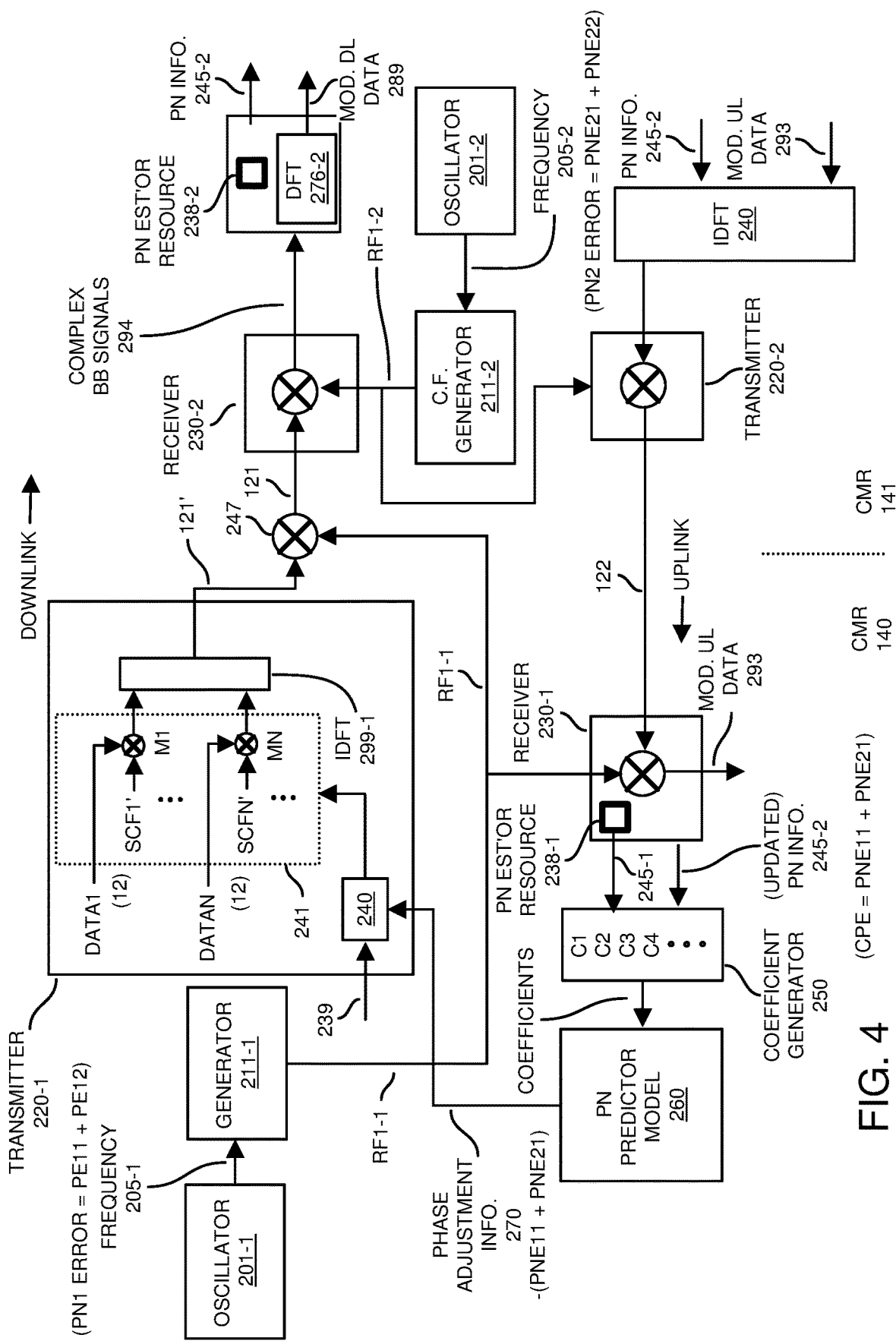
FIG. 4 is an example block diagram illustrating components of a wireless system and implementation of a first phase noise estimator in a first wireless station and a second phase noise estimator in a second wireless station according to embodiments herein.

FIG. 4 is an example block diagram illustrating components of a wireless system and implementation of a first phase noise estimator in a first wireless station and a second phase noise estimator in a second wireless station according to embodiments herein.

In this example embodiment, in a similar manner as previously discussed, the phase noise estimator resource 238-2 produces the phase noise information 245-2 based on receipt of one or more reference signals from the wireless station 131. The user equipment UE1 and corresponding communication management resource 141 communicate the phase noise information 245-2 to the wireless station 131 in a manner as previously discussed with respect to FIG. 2.

Additionally, in a manner as previously discussed in FIG. 3, the wireless station 131 implements phase noise estimator resource 238-1 to monitor reference signals (pilot signals) received from the user equipment UE1 to produce phase noise information 245-1. The coefficient generator 250 uses a combination of the phase noise information 245-1 and the phase noise information 245-2 (such as average of such information) to produce the respective coefficients C1, C2, etc., associated with the phase noise predictor model 260.

Thus, FIG. 4 illustrates implementing functionality from FIG. 2 and functionality from FIG. 3. In one embodiment, the phase noise predictor model 260 or other suitable entity produces the phase adjustment information 270 based on a combination of the phase noise information 245-1 (generated by the wireless station 131) and the phase noise information 245-2 (generated by the user equipment UE1).

FIG. 5 is an example diagram illustrating implementation of phase noise adjustments in the frequency domain according to embodiments herein.

In this embodiment, the phase adjustor 240 provides phase noise compensation to or associated with each of multiple sub-carrier frequencies SCF1, SCF2, . . . , SCF12. For example, the phase adjustor 240 applies phase adjustment information 270 to each of the sub-carrier frequencies SCF1, SCF2, etc. Application of the complex phase adjustment information 270 to the sub-carrier frequency SCF1 results in phase noise compensated sub-carrier frequency SCF1'; application of the complex phase adjustment information 270 to the sub-carrier frequency SCF2 results in phase noise compensated sub-carrier frequency SCF2'; application of the complex phase adjustment information 270 to the sub-carrier frequency SCF3 results in phase noise compensated sub-carrier frequency SCF3'; and so on. Thus, application of the phase adjustment information 270 to the sub-carrier frequencies provides phase noise compensation with respect to phase noise error (PNE11 and PNE21).

In one embodiment, because the magnitude of the phase noise error changes over time, the value of the phase adjustment information 270 is constantly updated such that the phase adjustment information 270 more closely tracks the phase noise error.

Figure 6:
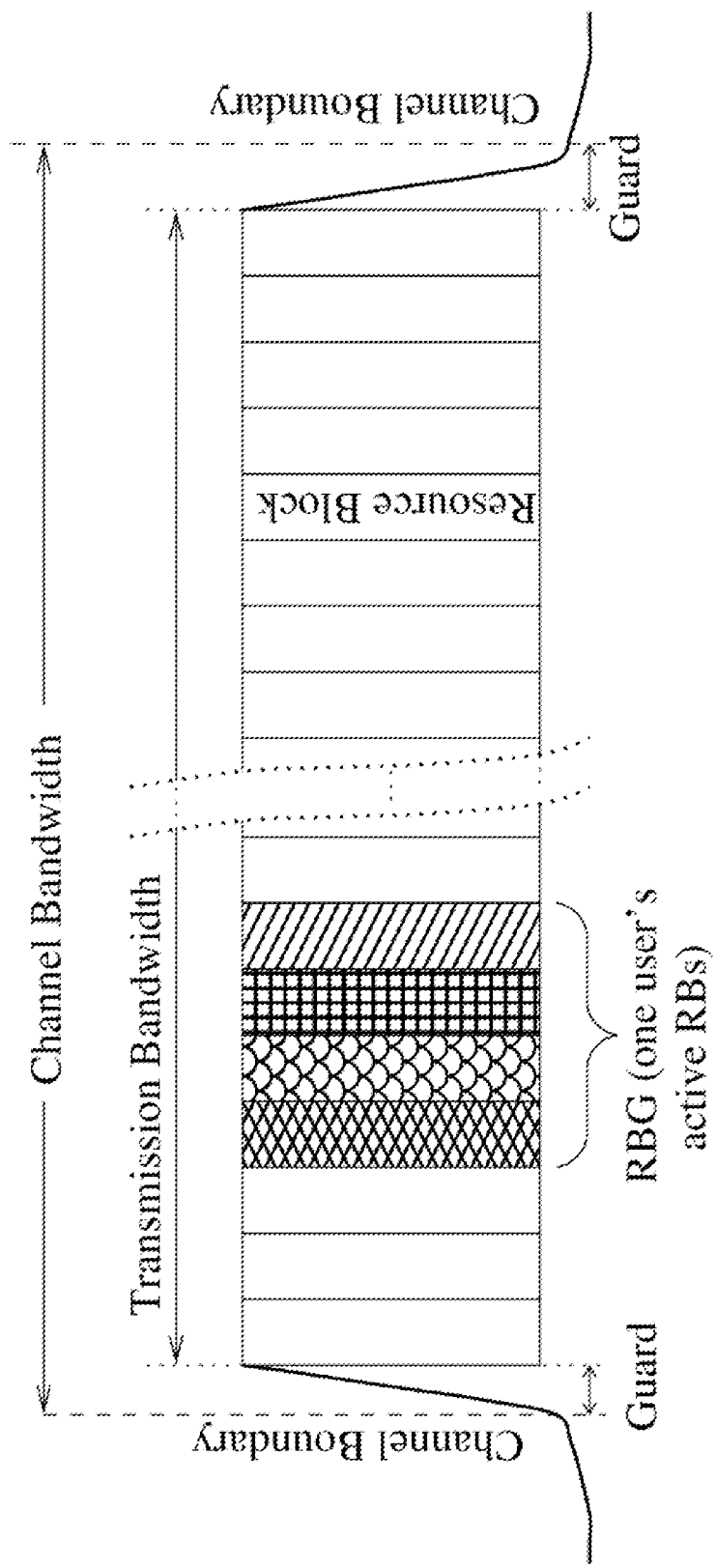
FIG. 6 is an example diagram illustrating allocation of a resource block group to a wireless station according to embodiments herein.

FIG. 6 is an example diagram illustrating allocation of a resource block group to a wireless station according to embodiments herein. Additional details of allocated resource blocks for uplink and downlink communications is further discussed below.

Figure 7:
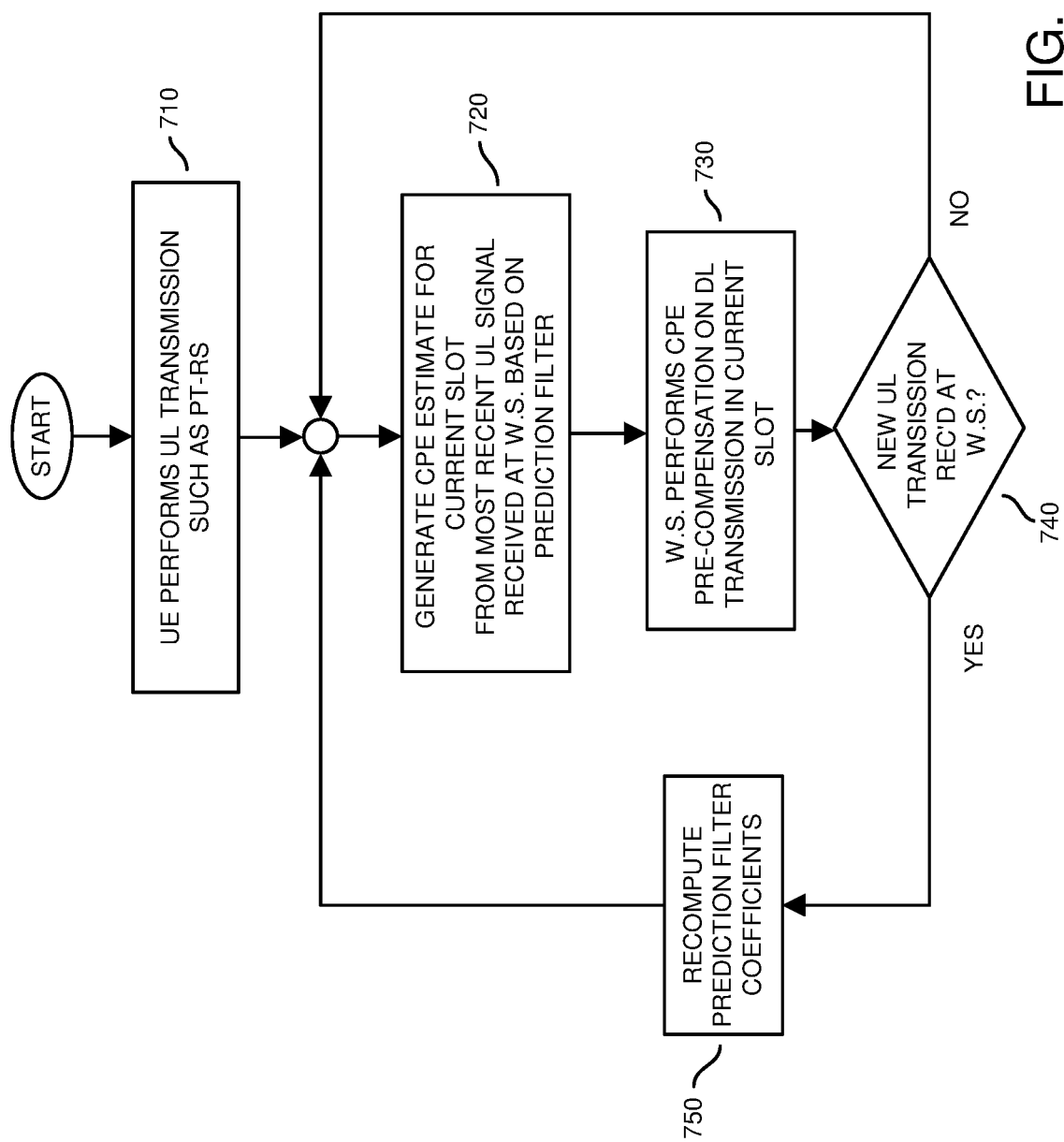
FIG. 7 is an example flowchart diagram illustrating implementation of phase noise estimation and phase noise compensation according to embodiments herein.

FIG. 7 is an example flowchart diagram illustrating implementation of phase noise compensation according to embodiments herein.

In this example embodiment, in processing operation 710, the user equipment UE1 performs transmission of pilot signals such as PT-RS (Phase Tracking Reference Signal) signals, DM-RS (Demodulation Reference) signals, etc., to the wireless station 131 in one or more assigned time slots, physical resource blocks, etc.

In processing operation 720, the phase noise predictor model 260 generates a common phase error estimate (such as phase adjustment information 270) for a most recent one or more time slots of received communications 122 (and reference signals) from the user equipment UE1.

In processing operation 730, the wireless station 131 generates a phase adjustment information 270 from the estimated common phase error and performs common phase error pre-compensation on the downlink communications 121 in one or more subsequent time slots.

In processing operation 740, if a new uplink communication is received at the wireless station 131, the phase noise estimator resource 238-1 produces updated phase noise information 245-1 for use by the phase noise predictor model 260 to produce the phase adjustment information 270 (one or more signals such as common phase error) sued to adjust subsequent communications 121. In this manner, the common phase error estimation is constantly updated to be as accurate as possible. Alternatively, if no new uplink communication is received at the wireless station 131 in paging occasion 740, the phase noise estimator resource 238-1 and phase noise predictor model 260 use the previously received phase noise information 245-1 to produce the phase adjustment information 270 (one or more signals such as common phase error).

Figure 8:
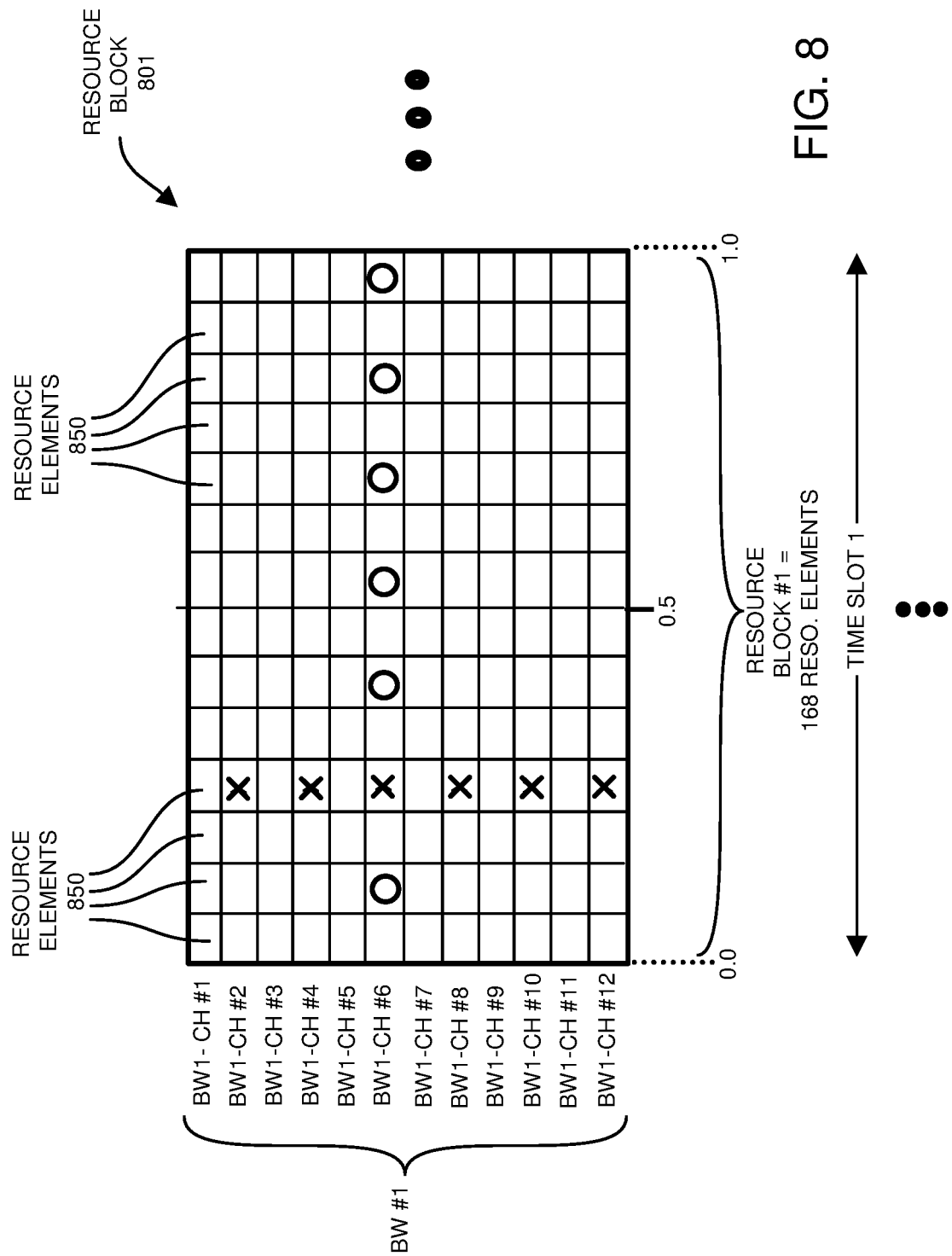
FIG. 8 is an example diagram illustrating a physical resource block and allocation of corresponding resource elements according to embodiments herein.

FIG. 8 is an example diagram illustrating a physical resource block and allocation of corresponding resource elements according to embodiments herein.

In this example embodiment, the physical resource block 801 includes multiple resource elements, each of which supports conveyance of a respective symbol. In the time domain, the physical resource block 801 falls within a time slot between time 0 and 1; the time slot #1 includes 14 sub-time slots, one for each symbol. In the time domain, the physical resource block 801 resides in bandwidth BW #1, including multiple sub-carrier frequencies in the base-band such as BW1-CH #1 (a.k.a., SCF1), BW1-CH #2 (a.k.a., SCF2), BW1-CH #3 (a.k.a., SCF3), . . . , BW1-CH #12 (a.k.a., SCF12). In one nonlimiting example embodiment, each sub-carrier frequency is spaced by 15 KHz; bandwidth BW1 therefore represents 180 KHz. In a manner as previously discussed, embodiments herein include providing compensation with respect to each of the sub-carrier frequencies when transmitting in a downlink direction from the wireless station 131 to the user equipment UE1.

In this embodiment, pilot or reference symbols are scheduled for transmission from the first wireless station to as always second wireless station in one or more of the resource elements 850 of the physical resource block 801. The pilot or reference symbols can be any suitable signals that serve phase tacking.

In one embodiment, the physical resource block 801 defines a schedule of communicating PT-RS and/or DM-RS signals that serve to assist phase tracking. For example, in one embodiment, the resource elements in the physical resource block 801 marked with an X represent scheduling of DM-RS signals; the resource elements in the physical resource block 801 marked with an O represent scheduling of PT-RS signals. Other resource elements 850 of the physical resource block 801 are used to communicate other data (such as DATA1, DATA2, etc.) between the wireless stations.

As further discussed below, each physical resource block can be assigned to support uplink or downlink communications.

Figure 9:
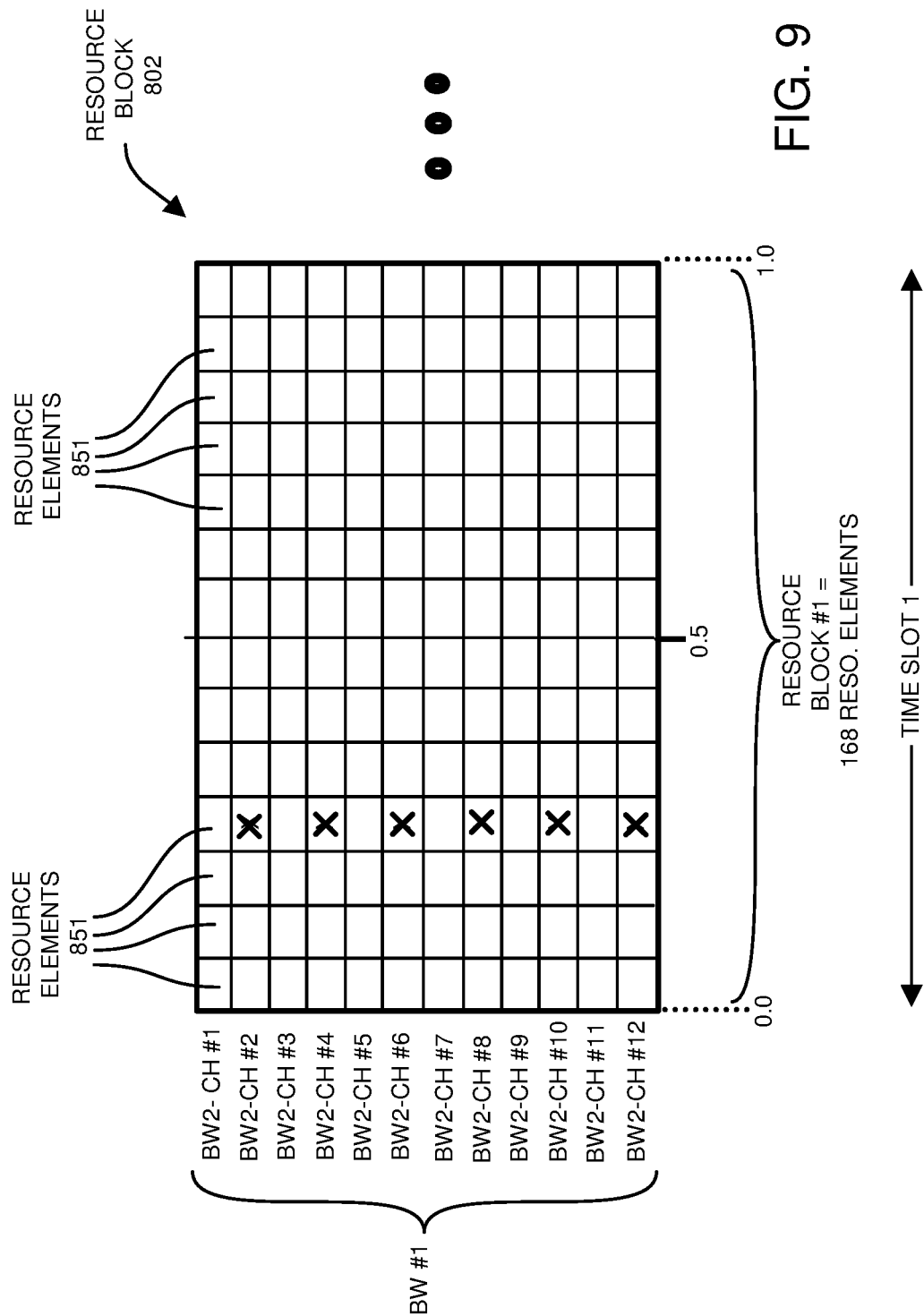
FIG. 9 is an example diagram illustrating a physical resource block and allocation of corresponding resource elements according to embodiments herein.

FIG. 9 is an example diagram illustrating a physical resource block and allocation of corresponding resource elements according to embodiments herein.

In this example embodiment, the physical resource block 802 includes multiple resource elements, each of which supports conveyance of a respective symbol. In the time domain, the physical resource block 802 falls within a time slot between time 0 and 1; the time slot #1 includes 14 sub-time slots, one for each symbol. In the time domain, the physical resource block 802 resides in bandwidth BW #2, including multiple sub-carrier frequencies BW2-CH #1, BW2-CH #2, BW2-CH #3, . . . , BW2-CH #12. In one nonlimiting example embodiment, each sub-carrier frequency in the base-band is spaced by 15 KHz, bandwidth BW2 represents 180 KHz.

In this embodiment, pilot or reference symbols are scheduled for transmission in one or more of the resource elements 851 of the physical resource block 802. The pilot or reference symbols can be any suitable signals that serve phase noise tracking. In further example embodiments, the physical resource block 802 defines a schedule of DM-RS signals that serve to assist phase tracking. For example, in one embodiment, the resource elements in the physical resource block 802 marked with an X represent scheduling of DM-RS signals.

Other resource elements 851 of the physical resource block 802 are used to communicate other data between the wireless stations.

As further discussed below, each physical resource block can be assigned to support uplink or downlink communications.

Figure 10:
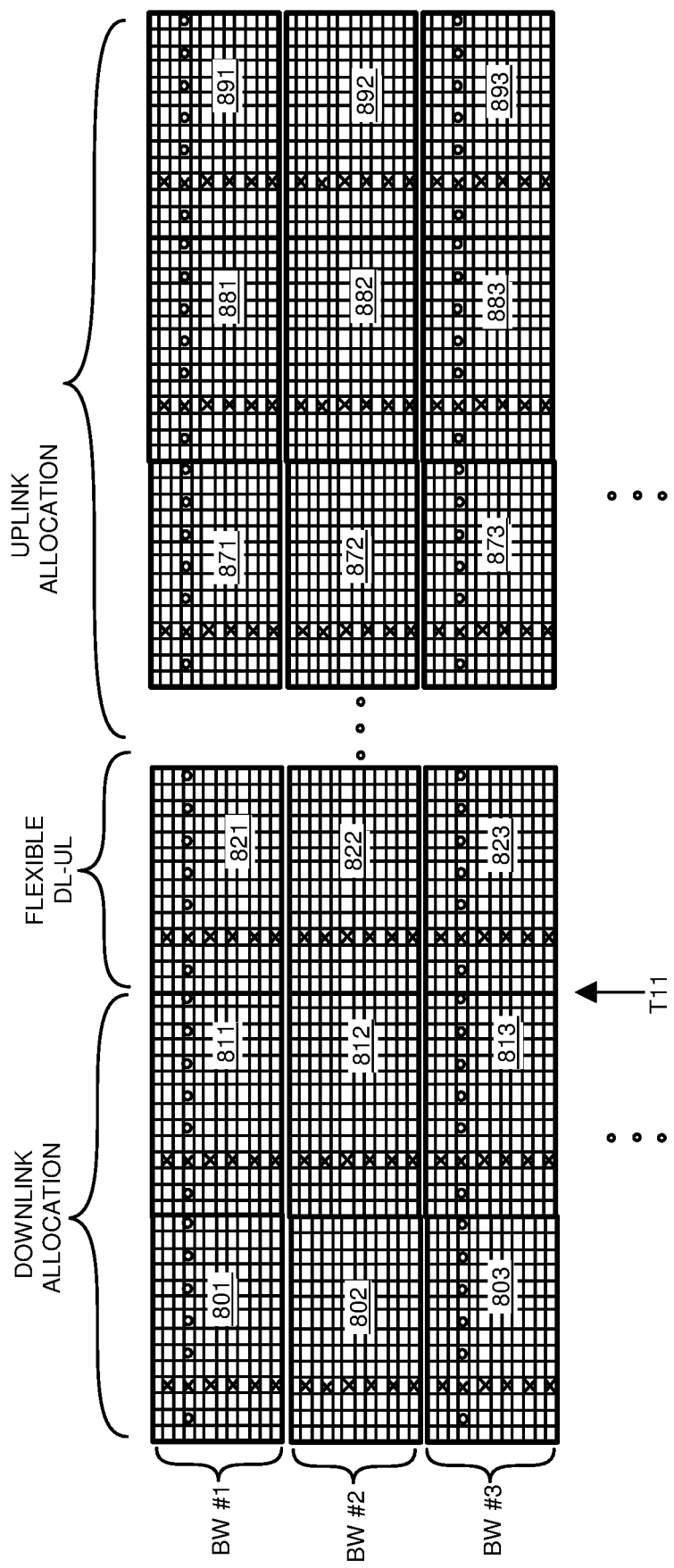
FIG. 10 is an example diagram illustrating implementation of multiple physical resource blocks and allocation of corresponding resource elements in the time domain and frequency domain to support downlink and uplink communications according to embodiments herein.

FIG. 10 is an example diagram illustrating implementation of multiple physical resource blocks and allocation of corresponding resource elements in the time domain and frequency domain to support downlink and uplink communications according to embodiments herein.

As previously discussed, bandwidth BW1 represents a first set of sub-carrier frequencies in which the communication management resource 140 applies compensation in a respective downlink in a manner as previously discussed; bandwidth BW2 represents a first set of sub-carrier frequencies in which the communication management resource 140 applies compensation in a respective downlink in a manner as previously discussed; bandwidth BW3 represents a first set of sub-carrier frequencies in which the communication management resource 140 applies compensation in a respective downlink in a manner as previously discussed; and so on.

In this example embodiment, the wireless station 131 or other suitable entity allocates use of the available wireless bandwidth for uplink and downlink communications. For example, in one embodiment, the resource blocks 801, 802, 803, . . . , resource blocks 811, 812, 813, . . . , are allocated to support downlink communications from the wireless station 131 to the user equipment UE1.

Certain resource blocks are flexible and can be allocated for uplink or downlink depending on the network conditions.

The resource blocks 821, 822, 823, . . . , resource blocks 871, 872, 873, resource blocks 881, 882, 883, . . . , resource blocks 891, 892, 893, . . . , are allocated to support uplink communications from the user equipment UE1 to the wireless station 131.

In one embodiment, in a manner as previously discussed, the resource elements in the physical resource blocks marked with an X represent scheduling of DM-RS signals; the resource elements in the physical resource block 802 marked with an O represent scheduling of PT-RS signals. Other resource elements 851 of the physical resource block 802 are used to communicate other data between the wireless stations.

Thus, in this example embodiment, multiple physical resource block are scheduled for data transmission with PT-RS density configured as (i) transmission in every other physical resource block (801, 811, 821, . . . , 871, 881, etc., 803, 813, 823, . . . , 873, 883, etc., as in the frequency domain, and (ii) every other OFDM symbol in the time domain.

Note that the DM-RS signal can be used for phase tracking in lieu of PT-RS since the PT-RS port is associated with a DM-RS antenna port (precoder is common but power may be different).

For PDSCH (Physical Downlink Shared CHANNEL), the subcarrier location (configurable by RRC or Radio Resource Control) of a PT-RS in a scheduled PRB is the same as one of the subcarriers used by the DM-RS of the lowest port number among the DM-RS ports used by the scheduled PDSCH.

PUSCH with CP-OFDM uses same design and procedures for PT-RS (albeit, default PT-RS is included with QPSK or Quadrature Phase Shift Keying, too).

A motivation for not transmitting PT-RS signals in one or more resource elements, if PT-RS time density is lower than every other OFDM symbol, is to reuse the CPE (derived from an OFDM symbol that contains a PT-RS) in one (or up to three) subsequent OFDM symbol(s).

In the example embodiment as discussed herein, phase noise prediction as discussed herein at the wireless station 131 (such as gNb or gNode B) supplies a common phase error prediction value and applies pre-compensation for each OFDM symbol communicated in the downlink.

Figure 11:
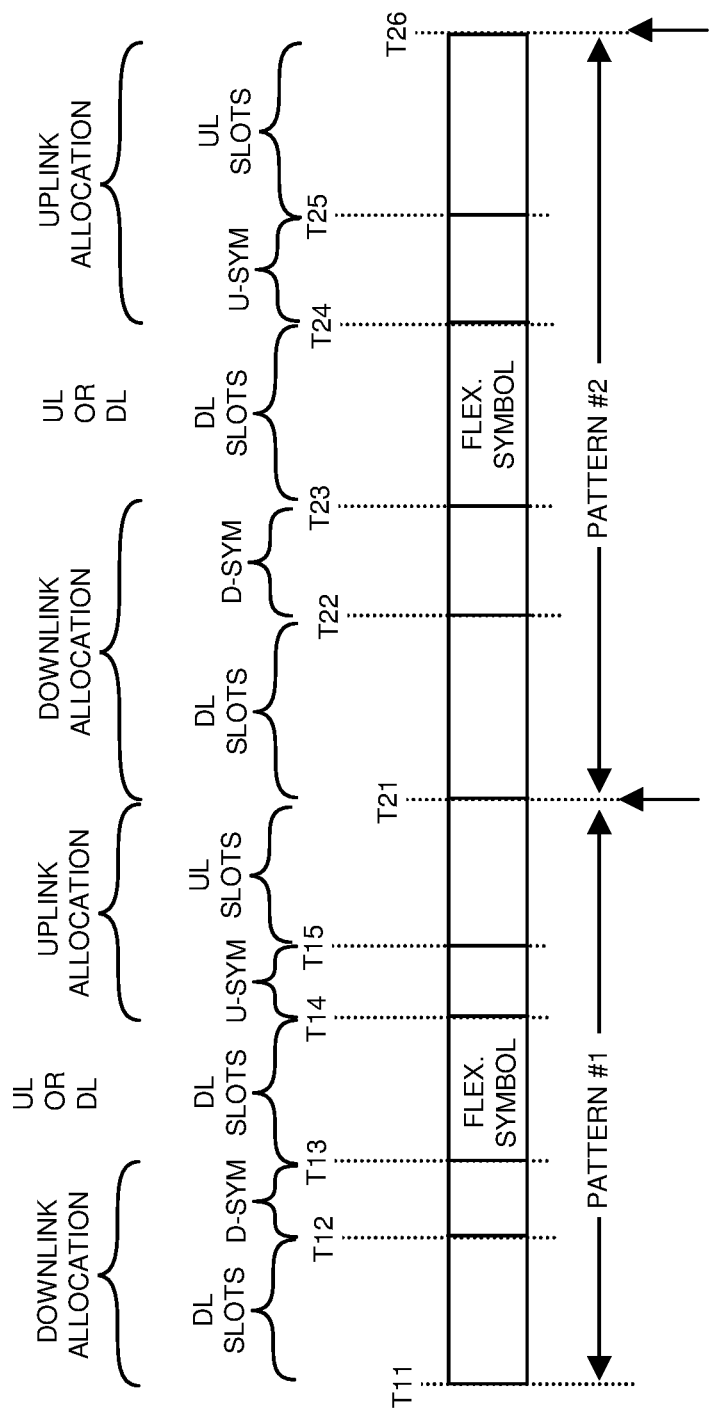
FIG. 11 is an example diagram illustrating allocation of uplink and downlink resources according to embodiments herein.

FIG. 11 is an example diagram illustrating allocation of uplink and downlink resources according to embodiments herein.

In this example embodiment, the IE TDD-UL-DL-Config is used to determine allocation of the Uplink/Downlink TDD (Time-Division Duplex) configuration used to communicate data from the wireless station 131 to the user equipment UE1 and vice versa. Both, UE- and cell-specific IEs exist—in one embodiment, assume former in the sequel.

In further example embodiments, the tdd-UL-DL-ConfigurationCommon provides (aside from a reference SCS configuration µref), a pattern1 and optionally a pattern2.

If pattern2 is present then the user equipment UE1 can be configured for two slot formats at a time, as shown in FIG. 11.

There are a number of full downlink slots, a number of first OFDM symbols at the beginning of the slot following the last full downlink slot, a number of consecutive full uplink slots at the end of each DL-UL pattern, and a number of consecutive uplink symbols in the end of the slot preceding the first full uplink slot. Remaining OFDM symbols are flexible symbols.

A straightforward exemplary embodiment as discussed herein may include the following operations:

1—Configure the wireless station 131 and the user equipment UE1 to communicate in accordance with pattern1 and a pattern2

2—Use the uplink transmissions (such as between T15 and T21) at the end of pattern1 to train the autoregressive (AR) model of the predictor at the wireless station 131

3—Implement coefficients as previously discussed to generate the phase adjustment information 270

4—Akaike criterion may indicate an order no larger than 20; 10 is typical for a spectrum with one spike (cf. PN spectrum)

5—Use the AR predictor model to predict CPE in the OFDM symbols at the beginning of pattern2 and communicating from the wireless station 131 to the user equipment UE1

In some embodiments prediction might be single step or multi-step (see current art)

6—Re-train the AR model (such as ppm 260) during the uplink transmissions at the end of pattern2

7—Go to operation 5 and continue, if the UE1 has further contiguous scheduling

Accordingly, with reference to FIG. 11, in one embodiment, between T11 and T14, the wireless station 131 allocates downlink resources (such as one or more physical resource blocks) as previously discussed to support communications from the wireless station 131 to the user equipment UE1. The downstream communications include one or more pilot symbols communicated to the user equipment UE11 as well as data. In one embodiment, the user equipment UE11 monitors phase noise and produces respective phase noise information based on the downlink communications. The wireless station 131 receives the phase noise information and provides pre-compensation in respective downlink slots such as between T21 and T24.

It is noted that the phase noise information and respective phase noise error changes over time. The immediate use of the phase noise information to update any phase noise error associated with downstream (downlink) communications ensures that the phase noise error correction is fairly up to date.

Figure 12:
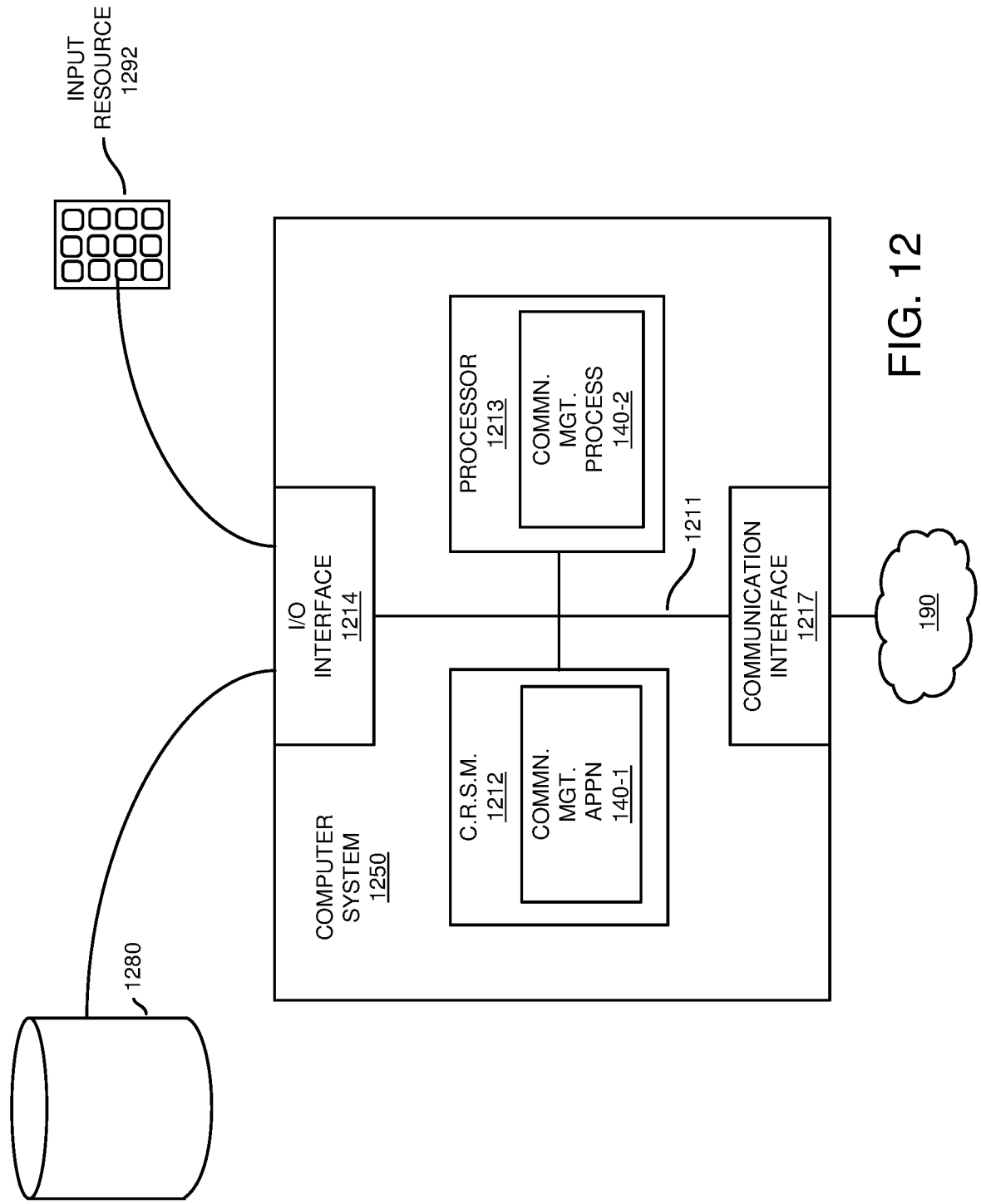
FIG. 12 is an example diagram illustrating example computer architecture operable to execute one or more operations according to embodiments herein.

FIG. 12 is an example block diagram of a computer system for implementing any of the operations as previously discussed according to embodiments herein.

Any of the resources (such as wireless station 131, user equipment UE1, communication management resource 140, communication management resource 141, coefficient generator 250, phase noise predictor model 260, phase adjustor 240, etc.) as discussed herein can be configured to include computer processor hardware and/or corresponding executable instructions to carry out the different operations as discussed herein.

As shown, computer system 1250 of the present example includes interconnect 1211 coupling computer readable storage media 1212 such as a non-transitory type of media (which can be any suitable type of hardware storage medium in which digital information can be stored and or retrieved), a processor 1213 (computer processor hardware), I/O interface 1214, and a communications interface 1217.

I/O interface(s) 1214 supports connectivity to repository 1280 and input resource 1292.

Computer readable storage medium 1212 can be any hardware storage device such as memory, optical storage, hard drive, floppy disk, etc. In one embodiment, the computer readable storage medium 1212 stores instructions and/or data.

As shown, computer readable storage media 1212 can be encoded with communication management application 140-1 (e.g., including instructions) in a respective wireless station to carry out any of the operations as discussed herein.

During operation of one embodiment, processor 1213 accesses computer readable storage media 1212 via the use of interconnect 1211 in order to launch, run, execute, interpret or otherwise perform the instructions in communication management application 140-1 stored on computer readable storage medium 1212. Execution of the communication management application 140-1 produces communication management process 140 2 to carry out any of the operations and/or processes as discussed herein.

Those skilled in the art will understand that the computer system 1250 can include other processes and/or software and hardware components, such as an operating system that controls allocation and use of hardware resources to execute communication management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1250 may reside at any location or can be included in any suitable resource in any network environment to implement functionality as discussed herein.

Functionality supported by the different resources will now be discussed via flowcharts in FIG. 13. Note that the steps in the flowcharts below can be executed in any suitable order.

Figure 13:
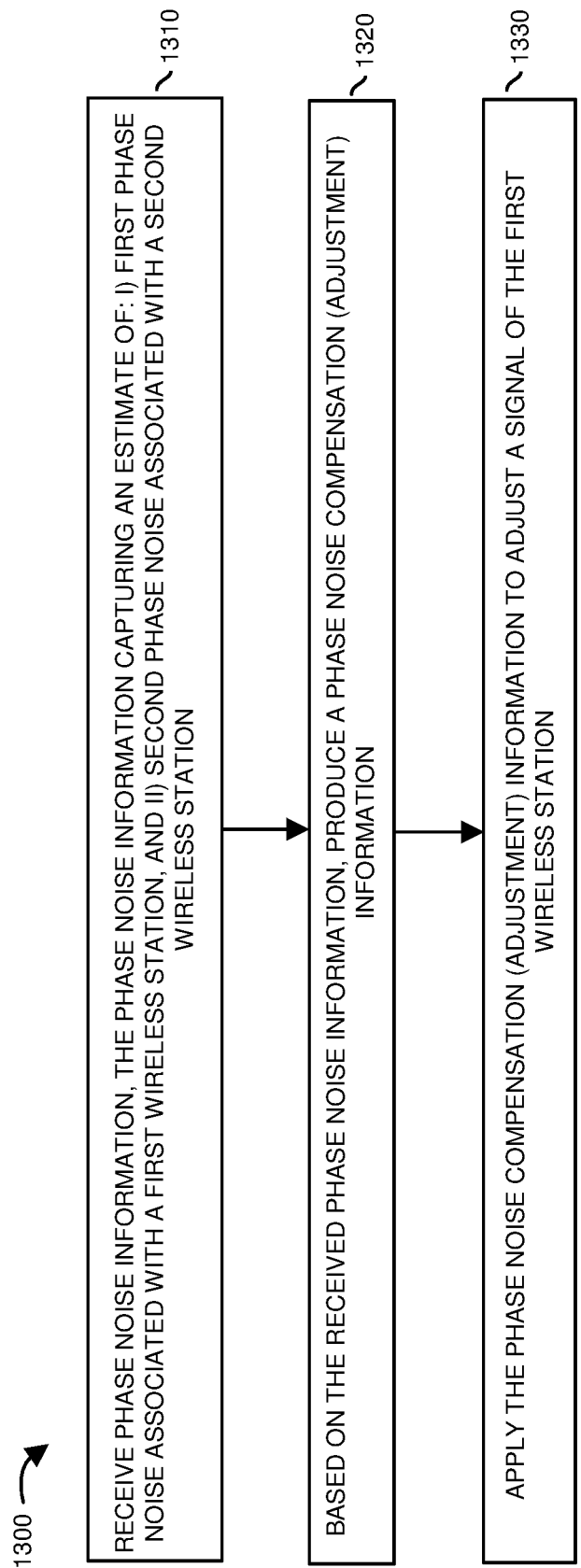
FIG. 13 is an example diagram illustrating a method according to embodiments herein.

FIG. 13 is a flowchart 1300 illustrating an example method according to embodiments herein. Note that there will be some overlap with respect to concepts as discussed above.

In processing operation 1310, phase noise predictor model 260 receives phase noise information 245 (as phase noise information 245-1 and/or phase noise information 245-2). The phase noise information captures an estimate of common phase error such as: i) first phase noise (such as PE11) associated with a first wireless station 131, and ii) second phase noise (such as PE21) associated with a second wireless station (user equipment UE1).

In processing operation 1320, based on the received phase noise information 245, the phase noise predictor model 260 produces a phase noise adjustment information 270 (phase noise compensation information associated with sub-carrier frequencies).

In processing operation 1330, the phase adjustor 240 applies the phase noise adjustment information 270 to adjust a signal of the first wireless station.

Note again that techniques herein are well suited to facilitate use of a shared wireless channel amongst different types of wireless stations. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A method comprising:
   receiving phase noise information, the phase noise information including an estimate of common phase error based on both: i) first phase noise associated with a first wireless station, and ii) second phase noise associated with a second wireless station, the second wireless station in communication with the first wireless station;
   based on the estimate of the common phase error of the received phase noise information, producing phase noise adjustment information; and
   applying the phase noise adjustment information to adjust a signal of the first wireless station communicated to the second wireless station.

2. The method as in claim 1, wherein application of the phase noise adjustment information provides phase noise compensation for both the first phase noise which is associated with a first local oscillator in the first wireless station and the second phase noise which is associated with a second local oscillator in the second wireless station.

3. The method as in claim 1, wherein receiving the phase noise information includes:
   receiving a communication from the second wireless station, the second wireless station generating the phase noise information based on a wireless communication received from the first wireless station.

4. The method as in claim 1, wherein receiving the phase noise information includes:
   at the first wireless station, generating the phase noise information based on a wireless communication received from the second wireless station.

5. The method as in claim 1 further comprising:
   controlling a density of repeatedly transmitting wireless reference signals between the first wireless station and the second wireless station based on the phase noise information; and
   wherein received samples of the wireless reference signal are used to derive the phase noise information.

6. The method as in claim 1 further comprising:
   deriving a set of coefficients from the phase noise information;
   applying the set of coefficients to a phase noise predictor model; and
   generating the phase noise adjustment information from the phase noise predictor model.

7. The method as in claim 6 further comprising:
   repeatedly updating the set of coefficients based on samples of the phase noise information received over time.

8. The method as in claim 7 further comprising:
   for a first set of coefficients derived from a first sample of the phase noise information, applying the phase noise adjustment information to adjust the signal for a duration of communicating multiple symbols from the first wireless station to the second wireless station.

9. The method as in claim 1 further comprising:
   receiving a first portion of the phase noise information from the first wireless station; and
   receiving a second portion of the phase noise information from the second wireless station.

10. The method as in claim 1, wherein the phase noise adjustment information provides phase adjust of the signal based on a summation of the first phase noise and the second phase noise.

11. The method as in claim 1 further comprising:
   generating the signal based at least in part from an output of a local oscillator of the first wireless station.

12. The method as in claim 1, and wherein the signal falls within a range between 50 and 80 GHz.

13. A system comprising:
   communication management hardware operative to:
      receive phase noise information, the phase noise information including an estimate of common phase error associated with both: i) first phase noise associated with a first wireless station, and ii) second phase noise associated with a second wireless station;
      based on the estimate of the common phase error of the received phase noise information, produce phase noise adjustment information; and
      apply the phase noise adjustment information to adjust a signal of the first wireless station communicated to the second wireless station.

14. The system as in claim 13, wherein application of the phase noise adjustment information provides phase noise compensation for both the first phase noise which is associated with a first local oscillator in the first wireless station and the second phase noise which is associated with a second local oscillator in the second wireless station.

15. The system as in claim 13, wherein the communication management hardware is further operative to:
   receive a communication including the phase noise information from the second wireless station, the second wireless station generating the phase noise information based on a wireless communication communicated from the first wireless station to the second wireless station.

16. The system as in claim 13, wherein the communication management hardware is further operative to:

at the first wireless station, generate the phase noise information via wireless reference signals received from the second wireless station.

17. The system as in claim 13, wherein the communication management hardware is further operative to:
control a density of repeatedly transmitting a wireless reference signal between the first wireless station and the second wireless station based on the phase noise information, samples of the wireless reference signal used to derive samples of the phase noise information.

18. The system as in claim 13, wherein the communication management hardware is further operative to:
derive a set of coefficients from the phase noise information; and
apply the set of coefficients to a phase noise analyzer model; and
generate the phase noise adjustment information from the phase noise analyzer model.

19. The system as in claim 18, wherein the communication management hardware is further operative to:
repeatedly update the set of coefficients based on samples of the phase noise information received over time.

20. The system as in claim 19, wherein the communication management hardware is further operative to:
for a first set of coefficients derived from a first sample of the phase noise information, apply the phase noise adjustment information to adjust the signal for a duration of communicating multiple symbols from the first wireless station to the second wireless station.

21. The system as in claim 13, wherein the communication management hardware is further operative to:
receive a first portion of the phase noise information from the first wireless station; and
receive a second portion of the phase noise information from the second wireless station.

22. The system as in claim 21, wherein the phase noise adjustment information is operative to adjust a phase noise of the signal based on a summation of the first portion of phase noise information and the second portion of phase noise information.

23. The system as in claim 13, wherein the communication management hardware is further operative to:
generate the signal based at least in part on an output of a local oscillator of the first wireless station.

24. The system as in claim 13, wherein the signal falls within a wireless range between 50 and 80 GHz.

25. Computer-readable storage hardware having instructions stored thereon, the instructions, when carried out by computer processor hardware, cause the computer processor hardware to:
receive phase noise information, the phase noise information including an estimate of common phase error based on both: i) first phase noise associated with a first wireless station, and ii) second phase noise associated with a second wireless station, the second wireless station in communication with the first wireless station;
based on the estimate of the common phase error of the received phase noise information, produce phase noise adjustment information; and
apply the phase noise adjustment information to adjust a signal of the first wireless station communicated to the second wireless station.

26. The method as in claim 6 further comprising:
generating the phase noise adjustment information via application of the set of coefficients to the phase noise predictor model.

27. The method as in claim 1, wherein applying the phase noise adjustment information to adjust the signal of the first wireless station includes:
applying the phase noise adjustment information to each of multiple sub-carrier frequencies to produce phase noise compensated sub-carrier frequencies.

28. The method as in claim 27 further comprising:
modulating the phase noise compensated sub-carrier frequencies with data to generate the signal communicated to the second wireless station.

29. The method as in claim 27, wherein application of the phase noise adjustment information reduces phase noise associated with the multiple sub-carrier frequencies.

30. The method as in claim 1, wherein applying the phase noise adjustment information includes:
in accordance with the phase noise adjustment information, implementing phase noise adjustments to the signal in the frequency domain.

31. The method as in claim 1, wherein applying the phase noise adjustment information includes:
in accordance with the phase noise adjustment information, implementing phase noise adjustments to the signal in the time domain.

32. The method as in claim 1, wherein applying the phase noise adjustment information to adjust the signal of the first wireless station includes:
applying the phase noise adjustment information to a first sub-carrier frequency to produce a first phase noise compensated sub-carrier frequency;
applying the phase noise adjustment information to a second sub-carrier frequency to produce a second phase noise compensated sub-carrier frequency;
via a first multiplier, modulating the first phase noise compensated sub-carrier frequency with first data; and
via a second multiplier, modulating the second phase noise compensated sub-carrier frequency with second data.

33. The method as in claim 32 further comprising:
deriving the signal from: i) the modulated first phase noise compensated sub-carrier frequency, and ii) the modulated second phase noise compensated sub-carrier frequency.

34. The method as in claim 1, wherein the estimate of common phase error is determined based on a separation between wireless reference signals.

35. The method as in claim 1, wherein the first phase noise is determined based on first wireless communications transmitted from the first wireless station to the second wireless station; and
wherein the second phase noise is determined based on second wireless communications transmitted from the second wireless station to the first wireless station.

36. The method as in claim 1, wherein the first phase noise is determined via a first phase noise estimator disposed in the second wireless station based on a first wireless communication received from the first wireless station; and
wherein the second phase noise is determined via a second phase noise estimator disposed in the second wireless station based on a second wireless communication received from the second wireless station.

* * * * *